United States Patent [19]

Lumelsky et al.

[11] Patent Number: 5,283,561
[45] Date of Patent: Feb. 1, 1994

[54] COLOR TELEVISION WINDOW FOR A VIDEO DISPLAY UNIT

[75] Inventors: Leon Lumelsky, Stamford, Conn.; Daniel H. McCabe, Chapel Hill, N.C.; Alan W. Peevers, Peekskill, N.Y.

[73] Assignee: International Business Machines Corporation, Armonk, N.Y.

[21] Appl. No.: 999,182

[22] Filed: Dec. 22, 1992

Related U.S. Application Data

[63] Continuation of Ser. No. 880,148, May 7, 1992, abandoned, which is a continuation of Ser. No. 812,863, Dec. 20, 1991, abandoned, which is a continuation of Ser. No. 722,369, Jun. 25, 1991, abandoned, which is a continuation of Ser. No. 314,998, Feb. 24, 1989, abandoned.

[51] Int. Cl.[5] .............................................. G09G 1/06
[52] U.S. Cl. .................................... 340/721; 395/154
[58] Field of Search ............... 340/701, 702, 703, 721, 340/723, 731, 747; 358/11, 22, 903; 395/154

[56] References Cited

U.S. PATENT DOCUMENTS

| | | | |
|---|---|---|---|
| 3,976,982 | 8/1976 | Eiselen | 340/172.5 |
| 4,148,070 | 4/1979 | Taylor | 358/160 |
| 4,163,249 | 7/1979 | Michael et al. | 358/21 R |
| 4,282,550 | 4/1981 | Coviello | 358/160 |

(List continued on next page.)

FOREIGN PATENT DOCUMENTS 59-023994 2/1984 Japan .

OTHER PUBLICATIONS

J. D. Foley and A. Van Dam *Fundamentals of Interactive Computer Graphics* (Addison-Wesley; Reading, Mass.; 1982) pp. 432–436.
CCIR Draft Recommendation 601 (MOD I) "Encoding Parameters for Digital Television for Studios" (1982).
ITT Semiconductors "VCU 2133 Video Codec Unit" (1986).
ITT Semiconductors "CCU 2030, CCU 2050, CCU 2070 Central Control Units".
Philips Export B. V. "Digital Video Signal Processing" (Jun. 1988). pp. 1–25.
Philips "SAA 9050" (Aug. 1988).
K. Kashiwaga and K. Kitamura, *IBM Technical Disclosure Bulletin*, vol. 27, pp. 4323–4325 (Dec. 1984).
A. Fernandez et al., *Global Telecommunications Conference*,, Tokyo, Japan pp. 731–739 (Nov. 15, 1987).
*IBM Technical Disclosure Bulletin*, vol. 31, pp. 324–327 (Nov. 1988).

*Primary Examiner*—Ulysses Weldon
*Assistant Examiner*—M. Fatahiyar
*Attorney, Agent, or Firm*—J. David Ellett, Jr.; Daniel P. Morris

[57] ABSTRACT

A circuit for interfacing between a digital-television circuit for producing pixel data for television images and a computer graphics display permits rapid scaling and positioning of live television images on the graphics display. In a preferred embodiment, the digital-television/computer-graphics interface circuit of the invention includes memory for storing a horizontal-scaling bit pattern and a vertical-scaling bit pattern. Such a preferred interface circuit is adapted to receive digital-television pixel data from the digital television circuit and, on a pixel-by-pixel basis depending on the state of corresponding bits in the horizontal-scaling bit pattern, to skip the pixel in the case of image contraction and to replicate the pixel in the case of image expansion. The preferred interface circuit is also adapted to receive digital-television pixel data on a television-line by television-line basis and, depending on the state of a corresponding bit of the vertical-scaling bit pattern, to skip the entire line of pixel data in the case of image contraction or to replicate the line in the case of image expansion. The interface circuit may include a hardware vector generator for generating scaling bit patterns in accordance with a procedure analogous to a vector-drawing procedure used in graphics displays, such as the "Bresenham procedure."

5 Claims, 14 Drawing Sheets

U.S. PATENT DOCUMENTS

| | | | |
|---|---|---|---|
| 4,381,547 | 4/1983 | Ejiri | 382/47 |
| 4,412,252 | 10/1983 | Moore and Wessel | 358/160 |
| 4,484,188 | 11/1984 | Ott | 358/11 |
| 4,518,984 | 5/1985 | Mitschke | 358/11 |
| 4,528,585 | 7/1985 | Bolger | 358/22 |
| 4,533,910 | 8/1985 | Sukonick | 340/721 |
| 4,549,275 | 10/1985 | Sukonick | 364/521 |
| 4,605,957 | 8/1986 | Yamada | 358/78 |
| 4,628,534 | 12/1986 | Marshall | 382/41 |
| 4,636,869 | 1/1987 | Tomohisa et al. | 358/287 |
| 4,644,409 | 2/1987 | Fuchs | 358/256 |
| 4,660,070 | 4/1987 | Nishi et al. | 358/11 |
| 4,686,580 | 8/1987 | Kato | 358/287 |
| 4,694,325 | 9/1987 | Mehrgardt | 358/11 |
| 4,712,130 | 12/1987 | Casey | 358/22 |
| 4,743,963 | 5/1988 | Abuyama | 358/77 |
| 4,814,860 | 3/1989 | Shiratsuchi | 358/22 |
| 4,814,873 | 3/1989 | Maekawa | 358/11 |
| 4,829,453 | 5/1989 | Katsuta et al. | 340/731 |
| 4,849,747 | 7/1989 | Ogawa et al. | 340/731 |
| 4,852,024 | 7/1989 | Kurakake et al. | 340/721 |
| 4,872,064 | 10/1989 | Tutt et al. | 358/464 |
| 4,890,257 | 12/1989 | Anthias et al. | 340/721 |

COLOR TELEVISION WINDOW FOR A VIDEO DISPLAY UNIT

This application is a continuation of application Ser. No. 07/880,148, filed 7 May 1992, which in turn was a continuation of application Ser. No. 07/812,863, filed 20 Dec. 1991, which in turn was a continuation of application Ser. No. 07/722,369, filed 25 Jun. 1991, which in turn was a continuation of application Ser. No. 07/314,998, filed 24 Feb. 1989, all now abandoned.

TECHNICAL FIELD

The present invention broadly concerns raster-scan graphic video-display units and, in particular, the display of live color-television images on such a raster-scan video-display unit.

BACKGROUND ART

Displaying a television image on a graphics screen generally requires a television signal defining the image to be digitally sampled and stored in a digital memory referred to as a frame buffer. Sampling and storage permits a time base of the television-image signal to be corrected - including, if necessary, a time compression of the television-image in order to show both television images and graphics images on the same screen. If it is desired to position a television image in an arbitrary window of the graphics screen, it will ordinarily be necessary to scale the dimensions of the television image down or up in the process of sampling. For some applications, it may be desirable that the image itself not be a full-screen image, but to be an arbitrary window located within the full-screen image.

FIG. 1 shows the mapping of a television source window 2 designated Ws into a high-resolution display-screen destination window 4 designated Wd. The following additional designations are used in FIG. 1: Ls—the number of lines in the full-screen television image; Ps—the number of samples representing an active part of the full-length television line; Xs,Ys—the width and height, respectively, of the television window measured in number of pixels and lines; xs and ys—coordinates of a pixel in the television window, relative to the upper left corner of this window; ps, ls—coordinates of the upper left corner of the television source window relative to the full television screen. Correspondingly, Ld designates the number of lines of the high-resolution destination screen. Pd represents the number of pixels read from the frame buffer and video refreshed during an active line of the high-resolution raster; Xd and Yd represent the length and height, respectively, of the destination window in the high resolution display where the television source window is to be mapped; xd, yd—coordinates of a pixel inside the destination window; pd, ld—coordinates of the upper left corner of the destination window relative to the upper left corner of the high-resolution display screen. For displaying a television image on a graphics screen, several features are desirable:

The full-size television screen image should correspond to the high-resolution display screen in terms of number of pixels per line and number of lines.

The sampling process should preserve a correct format ratio of image height to width. In other words, an object shape should not be distorted in the sampling process. For example, a circle should not become an oval.

It is advantageous to be able to select the ratio of height of the television source window to the height of the graphics-display destination window to be any desired rational number. Similarly, it is advantageous to be able to select the ratio of the width of the television source window to the width of the graphics-display destination window to be any desired rational number. Moreover, the selection of the two transformation ratios should be mutually independent. This provides for the mapping of an arbitrarily-chosen rectangular television window into any arbitrary rectangular graphics-display window.

The existing approaches attempting to satisfy the requirements set forth above involve an analog-scaling technique or a pixel-interpolation technique, both of which typically require bulky and expensive hardware.

The analog-scaling technique generally requires that sampling frequencies be manipulated or that the frequency of a video refresh clock be changed Neither of these two frequency-adjustment methods works well in vertical direction. Moreover, they typically provide only a restricted set of transformation ratios.

The pixel-interpolation hardware must be fast enough to satisfy live video-image sampling requirements. Moveover, the interpolation must be done on pixels of three colors (red, green and blue) in parallel. Consequently, interpolation hardware for color television is tripled in comparison with interpolation hardware for monochrome television images. In addition, the standard television coding schemes,—NTSC (USA, Japan), PAL (Germany, England), or SECAM (France, U.S.S.R)—are all based not on red/green/blue ("RGB") color video representation, but on luminance/chrominance ("Y/C") color video representation. Luminance/chrominance representation allows the video composite signal to take about half the bandwidth—each separately—than the bandwidth required for transmission of three signals encoding one of the three primary colors. Similarly, storage of digitized luminance/chrominance signals requires about half the memory than is required for storing digitized signals representing three primary colors.

For the reasons noted above, conventional analog-scaling methods and pixel-interpolation methods are principally limited to still-image capture systems, or to display of monochrome television images, or to television images of substantially reduced size and with substantially reduced frame-refresh frequency.

In general conventional analog scaling and interpolation techniques are too expensive to be used for displaying live television images on the graphics displays of low and medium cost workstations.

A recently-introduced digital-television technique is based on the luminance/chrominance representation of color television images for decoding, processing and storage. Depending on the television standard, the digital-television technique uses only one or two fixed standard sampling frequencies to provide digital processing of a television image, including digital decoding and brightness and hue control. The sampling frequency is chosen in view of certain characteristics of the television signal. In particular, the sampling frequency is fixed and is defined by reference to a multiple of the color subcarrier frequency in order to simplify the decoding and control of the color television signal. For example, one digital-television technique, referred to as the "ITT Intermetall" system uses a sampling frequency of 14.32 MHz which is four times the NTSC subcarrier frequency of 3.58 Mhz. In the ITT Intermetall system, each active television line is represented by 760 samples of luminance information and 380 samples of chrominance information. Each sample of luminanace is represented by 8 bits and each sample of chrominance is represented by 8 bits. The data structure is illustrated in FIG. 2. Chrominance C consists of two components, respectively designated "R-Y" and "B-Y." With digital data representing each of the three components luminance Y, R-Y chrominance and B-Y chrominance available, data representing the red R, green G and blue B primary colors may be derived according to certain rules. The ITT Intermetall procedure also includes a time-multiplexing technique to represent the luminance and chrominance information as 12-bit samples.

A second digital television technique is designated "CCIR 601" or the "4:2:2 standard." The digital-television system uses a sampling frequency of 13.5 Mhz which is approximately a multiple of horizontal frequency used in the SECAM or PAL color television system, namely 625 lines per frame, 50 frames per second, and a multiple of the horizontal frequency used in the NTSC color television system, namely 525 lines per frame, 60 frames per second. When using the 4:2:2 standard for sampling of NTSC television images, every active line is represented by 720 samples for luminance and 720 samples for chrominance.

The Philips Company markets integrated circuits for digital television processing which are based on the 13.5-Mhz sampling frequency, but which provide reduced chrominance resolution, as in case of the ITT Intermetall system. A time-multiplexing technique is also used to represent the sampled luminance/chrominance data by 12 bits per sample. For each television line, the Philips circuits provide 720 samples for luminance and 360 samples for chrominance.

There are several problems with adapting one of the conventional digital-television techniques to display television images on high-resolution graphics displays. Two problems arise from the use of a fixed sampling frequency and time multiplexing of luminance/chrominance data.

Use of a fixed sampling frequency precludes the use of the conventional analog-scaling approach to image transformation described above which involves changing the frequency of the sampling clock. Moreover, the time-multiplexed luminance/chrominance data format does not permit the use of the conventional pixel-interpolation technique for color pixels, without first taking additional time-consuming steps to convert the luminance/chrominance data to pixels representing the primary colors. After processing by the pixel-interpolation technique, the resulting pixels, which still represent the primary colors, must be converted back to the original luminance/chrominance format if the data is to be stored most compactly in digital memory.

A serious problem with adapting a conventional digital-television technique for displaying a television image on a high-resolution graphics display is that virtually no conventional graphics display uses the combination of number of pixels per line and number of lines per screen employed in the conventional digital-television schemes. Moreover, digital luminance/chrominance samples from a television line typically have an effective height-to-width ratio of substantially less than one. In contrast, conventional graphics displays, ordinarily have pixels with an effective height-to-width ratio of approximately one; that is, conventional graphics displays have essentially "square" pixels. The difference in effective height-to-width ratios is a consequence of differences in the requirements for the video clock in conventional graphics displays and for the sampling clock in conventional digital-television systems.

More specifically, the frequency of the video clock for a graphics display is generally based on requirements for the resolution of the display screen, relative to a size of a rectangular matrix of pixels displayed on the graphics display. Also, as noted above, the pixel height-to-width ratio is generally equal to essentially one in a graphics display. Use of such a "square" pixel makes it easier to calculate the coordinates of the pixels for representing vectors or polygons to be displayed on the display screen.

The width-to-height ratio of an active display area of a screen—be it a display screen of a graphics display or a television screen—is referred to as the "screen format ratio." Thus, for example, in a conventional graphics display with an effective pixel height-to-width ratio of essentially one and a screen format ratio of four to three, the number of pixels in an active line is equal to 4/3 of a number of active lines. The Video Graphics Adaptor for IBM "PS/2" workstation family has a resolution of 640 by 480 pixels, which corresponds to a screen format ratio of 4/3. Another IBM graphics adaptor designated model No. 8514A has a resolution of 1024 by 768 pixels, which also corresponds to a 4/3 screen format ratio. The present-day standard television receiver also has a screen format ratio 4 to 3, however, one proposed standard for high-definition television ("HDTV") has a screen format ratio of 16 to 9.

The problems of attempting to adapt conventional digital television techniques to show live television images on a conventional graphics display become even more complicated for window applications.

SUMMARY OF THE INVENTION

We have invented a method for mapping television images onto a graphics screen which can employ a standard digital-television technique to process the television signal and which avoids problems of the prior art noted above.

Broadly, the present invention is concerned with the sampling and storing of a color-television signal in accordance with both the requirements of digital television and the requirements of graphics displays—including windowing requirements —such as used with computers and computer workstations. The invention provides a method of contracting or expanding live color television images, which preferably had been sampled in accordance with a standard digital-television technique, while providing an output graphics image of a reasonable visual quality for the graphics display.

Preferred embodiments of the invention permit a computer graphics display to show a rectangular window portion of essentially arbitrary size and location from a television image in a rectangular window area of the graphics display, also of essentially arbitrary size and location. Moreover, preferred embodiments of the invention permit a television-screen format ratio to be either preserved or modified when a window of a standard television image is mapped into an arbitrarily-sized window on the graphics screen. Preferred embodiments of the invention permit the showing of high-definition television images with a 16:9 screen format ratio or other screen format ratio in a graphics display with a different resolution and with a 4/3 or other screen format ratio.

Preferred embodiments of the invention are well suited for use in a low or medium-cost workstation environment, since they make possible the use of standard digital-television integrated circuits and other hardware for sampling, coding and restoring television images for display on a graphics display. Standard digital-television hardware which is produced for consumer television receivers is generally suitable for use in the present invention and is typically inexpensive and compact.

In one preferred method of the invention, a number Xs of source samples representing a line of a source television image—either a full-screen image or a window portion image—are mapped to a number Xd of destination pixels in a destination graphics-display memory. If the number of source samples exceeds the number of pixels; i.e., if $Xs > Xd$, the image may be contracted in the X dimension by deleting certain of the source samples in the course of mapping the source samples to the destination pixels. If the number of source samples is less than the number of destination pixels; i.e., if $Xs < Xd$, the image may be expanded in the X dimension by replicating certain of the source samples in the course of mapping the source samples to the destination pixels. An image-scaling control pattern comprising a sequence of bits is used to determine which source samples are to be skipped or replicated, as the case may be. The image-scaling control pattern has a number of bits equal to or greater than the greater of the number of source samples Xs and the number of destination pixels Xd. The image-scaling control pattern is preferably generated using a computer-graphics vector-drawing procedure. A vector-drawing procedure known as the Bresenham vector-drawing procedure is particularly preferred. The use of a vector-drawing process permits images to be scaled rapidly and essentially uniformly. Graphics display windows containing television images may be repositioned and resized rapidly.

BRIEF DESCRIPTION OF THE DRAWINGS

Preferred embodiments of the present invention are described with reference to the following drawings.

DESCRIPTION OF PREFERRED EMBODIMENTS

Figure 1:
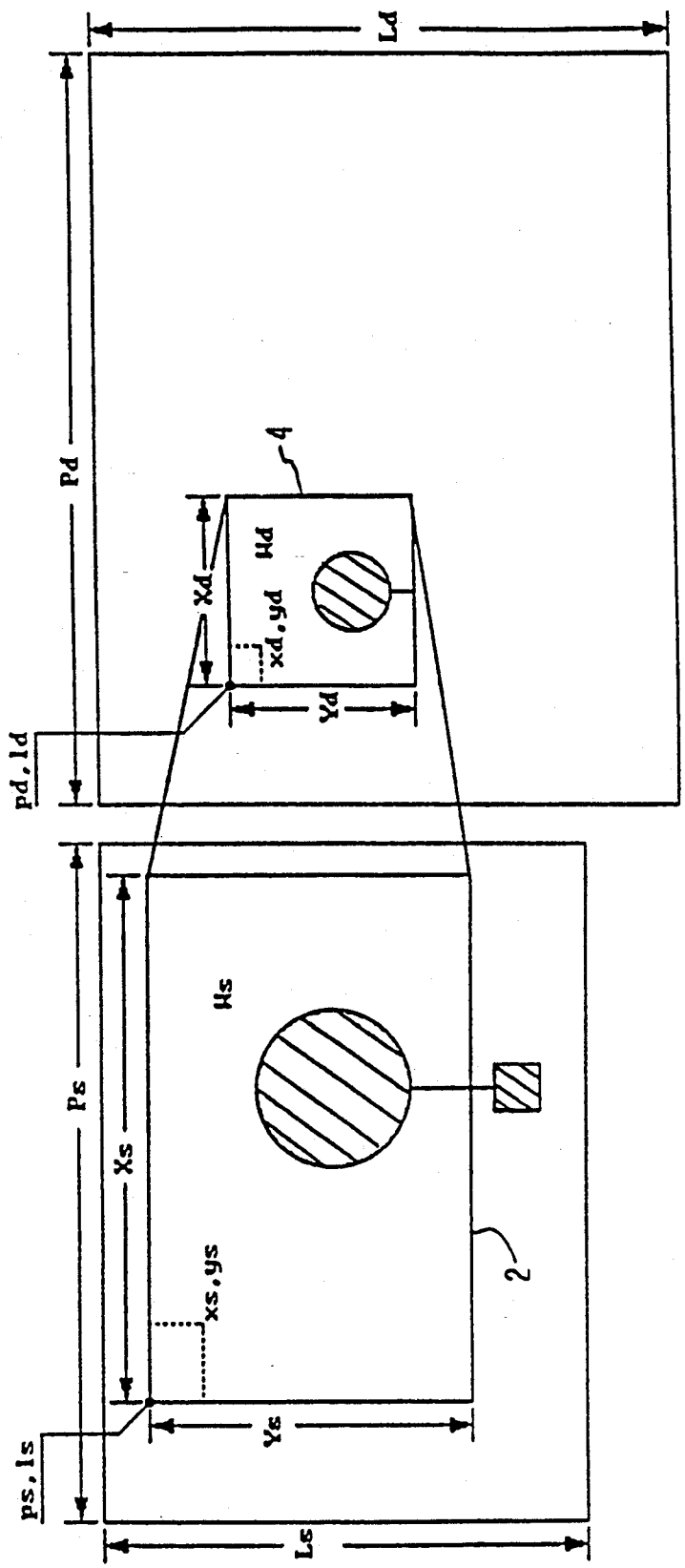
FIG. 1 is a schematic diagram representing the mapping of a window-portion of a television image onto a window area of a graphics display.
Figure 2:
FIG. 2 is a diagram of a prior-art digital-television technique for representing a color television signal, discussed in the Background Art section above.
Figure 3:
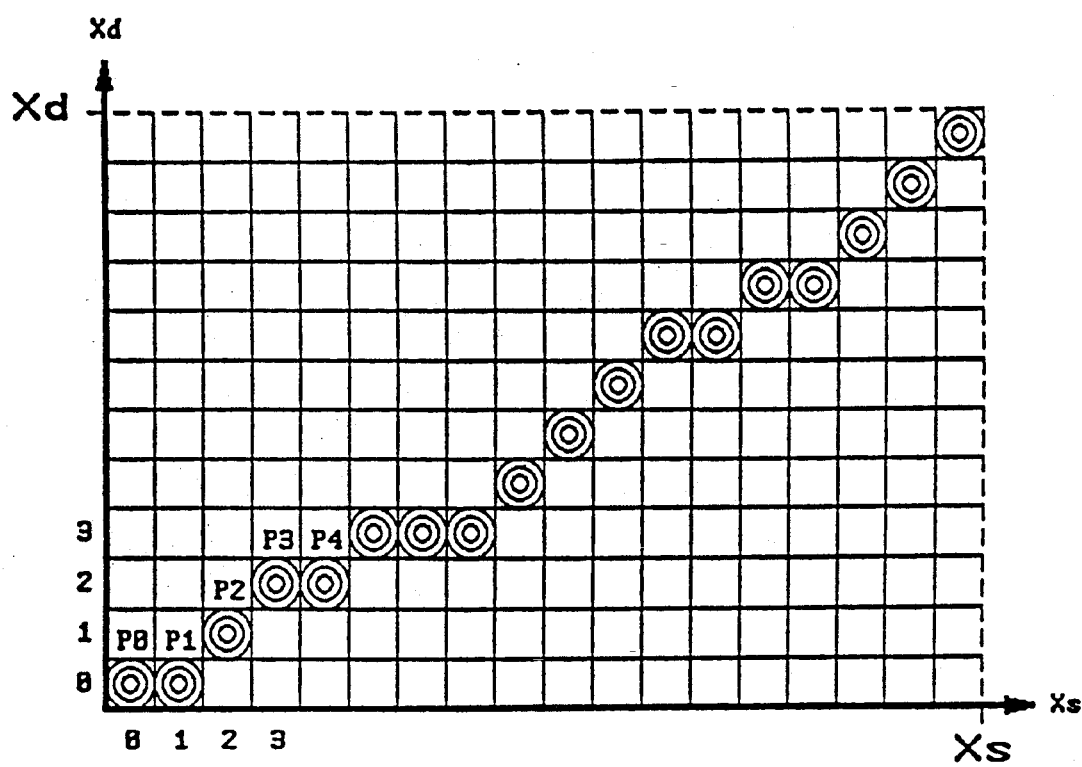
FIG. 3 is a schematic diagram of the representation of a linear vector on an array of pixels in a graphics display.

Turning now to FIG. 3, consider mapping a number Xs of source samples representing a line of a source television image to a number Xd of destination pixels in the image-contraction case $Xd < Xs$. Now, consider the process of drawing a straight-line vector extending between end coordinates (0,0) and (Xs,Xd) on a rectangular grid of coordinates designated (xs,xd) by placing a set of pixels to represent the vector on the coordinate grid. Vector-drawing procedures involve starting with a point P0 and placing it onto the origin defined by coordinates (0,0). Thereafter, sequentially for each successive xs coordinate $xs' = xs + 1$, by a calculation it is determined whether or not to increment the xd coordinate to locate the coordinates (xs', xd') in which successive points representing the vector are to be placed. Analagous steps can be carried out to calculate the mapping of Xs source samples to Xd destination locations. In general, the Xs source samples are designated s0, s1, s2, s3, ... and may be associated with the xs coordinates in the vector-drawing procedure. The Xd destination pixels are designated p0, p1, p2, p3, ... and may be associated with the xd coordinates in the vector-drawing procedure. Each time an increment xd coordinate would have been determined in the vector-drawing procedure for placement of a point representing the vector, a corresponding source sample is mapped to a destination pixel. Thus, for the image-scaling mapping analagous to the vector-drawing procedure illustrated in FIG. 3, the source samples s0, s2, s3, s5, ... would be mapped to destination pixels p0, p1, p2, ... in a frame buffer. The source samples s1, s4, s6, ... can be skipped. As a result, a generally uniform distribution of the set of source samples is mapped onto a set of destination pixels. Similar considerations are applied in the image expansion case of $Xd > Xs$, with the difference that certain source samples are replicated instead of skipped.

The same procedure is applied independently for the vertical direction with respect to entire lines. In particular, a vector-drawing algorithm directs whether to skip or replicate particular television lines in the course of storing source lines in a destination frame buffer.

In general, processing of the X and Y dimensions of the television image are carried out independently of one another. Furthermore, the scaling process is essentially identical for both dimensions. The X dimension will be considered in detail. The treatment of the Y dimension is analagous with entire television lines substituted for source samples, and for conciseness will not be discussed in detail.

The basic image scaling operation can be expressed as xd = xs * Xd/Xs, where:
  xd is the current pixel position of the destination image;
  xs is the current pixel position of the source image,
  Xd is the total size in the X dimension of the destination image; and
  Xs is the total size in the X dimension of the source image.

Since a discrete grid of pixels is being processed, all coordinates assume integral values. There are three cases to consider: (a) Xd>Xs, (b) Xd=Xs, and (c) Xd<Xs. In the case of Xd>Xs, the destination image is larger than the source image, resulting in an expansion of the original image. In this situation, a single source sample may map to multiple destination pixels. In other words, each source sample is replicated into at least one and possibly a plurality of destination pixels. When Xd=Xs, the two images are the same size, so the scaling operation is a trivial one-for-one mapping. In the case of Xd<Xs, the destination image is smaller than the source image, resulting in a contraction of the image. In this situation, multiple source samples may map to a single destination pixel. There are several strategies which can be used for determining which source sample or samples contribute to a particular destination pixel, as discussed below.

A. Image Expansion

Suppose an image is to be expanded, that is, suppose Xd>Xs. Let us begin by defining an error term E as:

E(xd, xs) = 2 * xs * Xd − 2 * xd * Xs.

The error term is a restatement of the scaling operation; the source and destination coordinates xs and xd have been cross-multiplied by the source and destination sizes Xs and Xd and the result multiplied by a factor of 2. In theory, for all possible source-destination pairs considered as continuous variable, only those which satisfy the condition E=0 identically would represent valid source and destination coordinates. In practice, the source and destination coordinates are constrained to a discrete grid. Consequently in general the coordinate choices will result in a non-zero error. However, values for xs and xd can be chosen such that the error E will tend to vanish on the average.

As noted above, for image expansion, each source coordinate maps to one or more destination coordinates. There are more destination coordinates than source coordinates. Each destination coordinate will be processed individually. In particular, for each destination coordinate in turn, a decision must be made whether to use the source coordinate which was used for the immediately preceding destination coordinate or to use the next succeeding source coordinate. Thus, for the next succeeding destination coordinate, xd+1, it must be decided whether the source coordinate xs maps to that coordinate, or whether xs+1 maps to that coordinate. This decision is made by examining the error term E.

$$E(xd + 1, xs) = 2 * xs * Xd - 2 * (xd + 1) * Xs,$$
$$= 2 * xs * Xd - 2 * xd * Xs - 2 * Xs,$$

or, $$E(xd + 1, xs) = E(xd, xs) - 2 * Xs. \quad (I)$$

Similarly, $$E(xd + 1, xs + 1) = 2 * (xs + 1) * Xd - 2 * (xd + 1) * Xs,$$
$$= 2 * xs * Xd - 2 * xd * Xs + 2 * Xd - 2 * Xs,$$

or, $$E(xd + 1, xs + 1) = E(xd, xs) + 2 * (Xd - Xs). \quad (II)$$

Recall that for image expansion, Xd>Xs, so that Xd−Xs>0 and that, by definition, Xs>0. Expressions (I) and (II) are the basis for the following strategy to minimize the error term E on the average: if E(xd, xs)>0, the error term should be made more negative; a step to (xd+1, xs) will approach this goal. Conversely, if E(xd, xs)<0, then the error term should be made more positive; a step to (xd+1, xs+1) will tend to approach this goal.

To start this procedure, two initial values for the error term E are required. For a first initial value of the error term E, E(0, 0)=0 since without loss of generality as a practical matter the first source and destination coordinates can be assigned the value zero.

Based on geometric considerations, for a second initial value of the error term E, the error for the second destination coordinate and halfway between the first and second source coordinates may be taken. Specifically, consider E(xd,xs) at xd=1 and xs=½:

$$E(1, 1/2) = 2 * (1/2) * Xd - 2 * (1) * Xs,$$
$$= Xd - 2 * Xs.$$

An algorithm for image expansion in a Pascal programming language has the form:

```
ExpandImage (Xd, Xs)
INT   Xd;                          /* total number of destination
                                      pixels */
INT   Xs;                          /* total number of source
                                      pixels */
BEGIN
  error = Xd − 2 * Xs;             /* pick initial error */
  xs = 0;                          /* start at first source pixel */
  xd = 0;                          /* start at first destination
                                      pixel */
  WHILE (xd < Xd)                  /* for all destination pixels */
    pixel = GetPixel(xs);          /* read the source pixel */
    PutPixel(xd, pixel);           /* write the destination
                                      pixel */
  IF (error < 0)                   /*Is error negative?*/
    error = error + 2 * (Xd − Xs); /* make error more positive */
    xs = xs + 1;                   /* next source pixel */
  ELSE
    error = error − 2 * Xs;        /* make error more
                                      negative */
  END IF
    xd = xd + 1;                   /* next destination pixel */
  END WHILE
```

-continued

```
END
```
NOTE: the fetching of the next source pixel does not need to be performed for each destination pixel, since a source pixel can in general several times.

B. Image Contraction

In the case of Xd<Xs, the source image is reduced in size to fit into the destination image. The analysis of the contraction is similar to that of the expansion discussed in the preceding subsection. At the outset an error term E is defined:

$$E(xs, xd) = 2 * xd * Xs - 2 * xs * Xd.$$

The error term for contraction involves a cross multiplication as did the error term for expansion. However, the two error terms differ in that the source and destination coordinates and the source and destination sizes are exchanged.

For image expansion, the destination image had more pixels than the source. Therefore, all destination coordinates were processed in turn and a decision was made whether to move to the next source coordinate. With image contraction, the situation is reversed. For image contraction, all source coordinates are processed in turn and for each source coordinate a decision is made whether to advance to the next destination coordinate.

Note that the image contraction operation maps multiple source samples onto a single destination pixel. In such a case, either some of the source samples can be discarded, resulting in information loss, or an aggregate contribution of multiple source pixels can be included in each destination pixel, as discussed in detail below.

For each source coordinate, it must be decided whether to use the destination coordinate which was used for the immediately preceding source coordinate or whether to advance to the next succeeding destination coordinate. Thus, for the next succeeding source coordinate, $xs+1$, it must be decided whether the destination coordinate $xd$ maps to that coordinate, or whether the next succeeding destination coordinate $xd+1$ maps to that coordinate. This decision is made by examining the error term E for the two cases $(xs+1, xd)$ and $(xs+1, xd+1)$:

Thus, $$\begin{aligned} E(xs + 1, xd) &= 2 * xd * Xs - 2 * (xs + 1) * Xd, \\ &= 2 * xd * Xs - 2 * xs * Xd - 2 * Xd, \end{aligned}$$

or, $$E(xs + 1, xd) = E(xs, xd) - 2 * Xd. \quad \text{(III)}$$

Similarly, $$\begin{aligned} E(xs + 1, xd + 1) &= 2 * (xd + 1) * Xs - 2 * (xs + 1) * Xd, \\ &= 2 * xd * Xs - 2 * xs * Xd + \\ &\quad 2 * Xs - 2 * Xd, \end{aligned}$$

or, $$E(xs + 1, xd + 1) = E(xs, xd) + 2 * (Xs - Xd). \quad \text{(IV)}$$

Recall that by definition Xd>0 and that Xs>Xd for image contraction so that Xs−Xd>0. Thus expression (IV) implies that the error term E(xs, xd) will be made more positive by advancing toward $(xs+1, xd+1)$. Conversely, expression (III) implies that E(xs, xd) will be made more negative by advancing toward $(xs+1, xd)$.

By analogy to the image-expansion case discussed above, two initial values of the error term for image reduction can be taken to be:

$$\begin{aligned} E(0, 0) &= 0, \quad \text{and} \\ E(1, 1/2) &= 2 * (1/2) * Xs - 2 * (1) * Xd \\ &= Xs - 2 * Xd. \end{aligned}$$

The algorithm for image contraction in a Pascal programming language has the form:

| ReduceImage (Xs, Xd) | |
|---|---|
| INT   Xs; | /* total number of source pixels */ |
| INT   Xd; | /* total number of destination pixels */ |
| BEGIN | |
| error = Xs − 2 * Xd; | /* pick initial error */ |
| xd = 0; | /* start at first destination pixel */ |
| xs = 0; | /* start at first source pixel */ |
| WHILE (xs < Xs) | /* for all source pixels */ |
| pixel = GetPixel(xs); | /* read the source pixel */ |
| PutPixel(xd, pixel); | /* write the destination pixel */ |
| IF (error < 0); | /* Is error negative? */ |
| error = error + 2 * (Xs − Xd); | /* make error more positive */ |
| xd = xd + 1; | /* next destination pixel */ |
| ELSE | |
| error = error − 2 * Xd; | /* make error more negative */ |
| END IF | |
| xs = xs + 1; | /* next source pixel */ |
| END WHILE | |
| END | |

As was previously mentioned, in the case of image contraction, multiple source samples can map to any particular destination pixel, which represents a loss in information content. There are several ways to deal with this decrease in information content. A simplest approach for dealing with the decrease in information content is to ignore it. The procedure set forth above takes this approach. Thus, when plural source samples map to a single destination pixel, only one of the source samples is chosen. The other source samples are discarded.

A more preferred approach for dealing with the problem is to average the source samples and write that average into the destination pixel. Conventional anti-aliasing techniques employ a generally-similar averaging technique. One problem with such an averaging approach is that it is expensive to implement in hardware, especially when it must be performed at video rates.

A particularly preferred approach is to introduce a "jitter" in the scan line processing. Up to now, the processing of each scan line has been essentially identical. In particular, because the initial error term was identical for each scan line, the same source samples are discarded for each scan line. This can result in artifacts, such as losing entire vertical lines in images.

The particularly preferred approach is to process each scan line differently from its neighbors. For example, a different initial error term can be used for each scan line. In the image-contraction procedure discussed above, the initial value for the error was determined by examining the error at (1, ½). If the destination threshold is sampled randomly at a first source transition, initial values for the error term will be found which still produce approximately correct images. Specifically, the error term E may be examined at (1, r), where r is a random number in the range 0<r<1. In that case, $$E(1, r) = 2 * r * Xs - 2 * (1) * Xd.$$

The initial value of the error term E will vary between $-2 * Xd$ and $2 * (Xs - Xd)$, and to the extent that r is uniformly distributed between 0 and 1, will be uniformly distributed in that interval. The average initial value of the error term E will be $Xs - 2 * Xd$, which was the initial error of the original image-contraction procedure.

Figure 4:
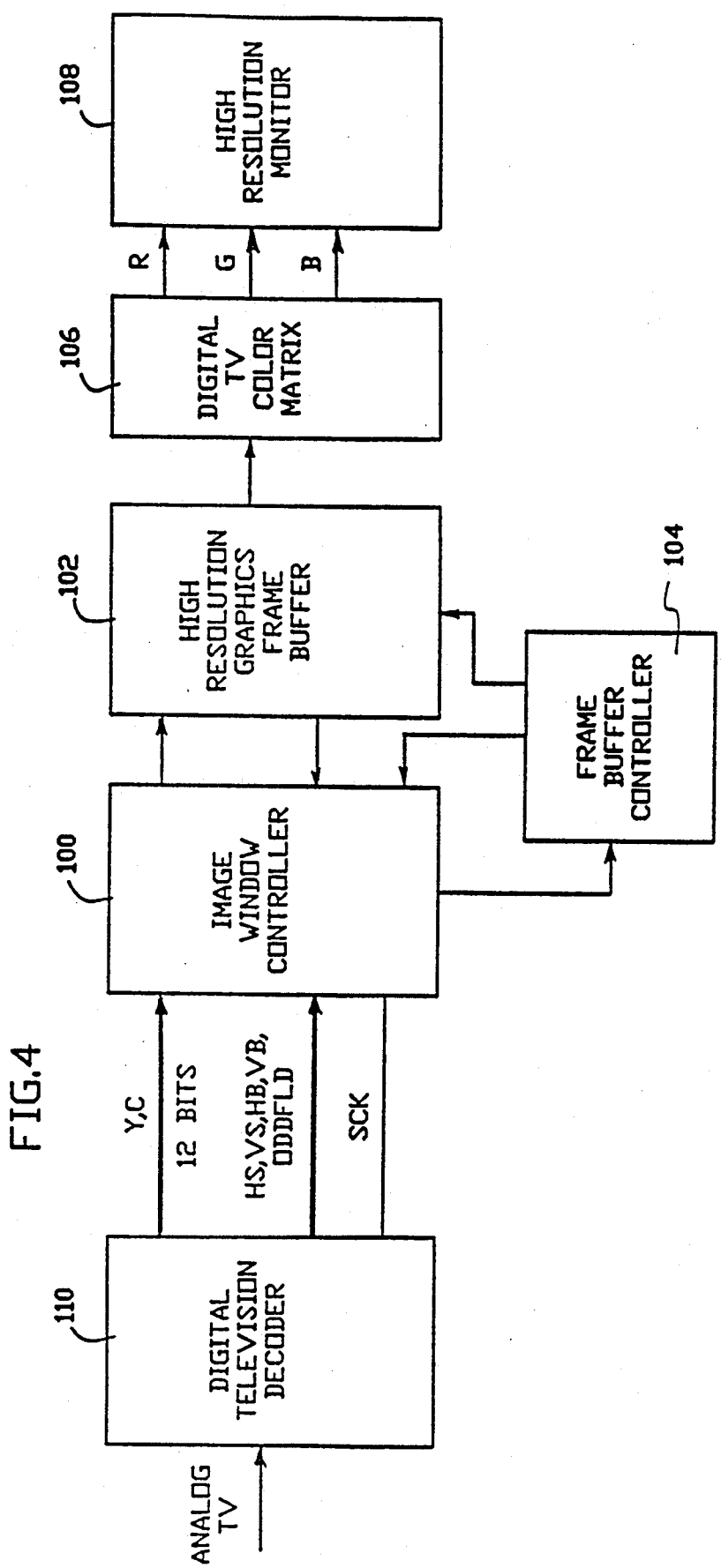
FIG. 4 is a block diagram of a preferred digital-television/graphics display interface of the present invention.

Referring now to FIG. 4, a high-resolution graphics display accepts a live television signal from an analog television source. The television signal is decoded and digitized to a digital luminance/chrominance Y,C format by a digital television decoder 110. The decoded television signal is processed by an image window controller 100, and loaded into a high-resolution frame buffer 102 under the control of a frame buffer controller 104. Finally, the content of the frame buffer 102 is decoded to a red/green/blue representation by a digital television color matrix 106, to be shown on a monitor screen of the high-resolution display 108. The digital television decoder 110 also supplies a vertical synchronization signal VS, a horizontal synchronization signal, HS, a vertical blanking signal VB, a horizontal blanking signal HB, an odd/even field-specification signal ODDFLD and a sampling clock signal SCK. The frame-buffer controller 104 receives a request from the image window controller 100 to start loading data output from the image window controller 100 into the frame buffer 102 and also provides the image-window controller with the coordinates specifying the graphics window on the display screen. The image window controller 100 and its interface with the frame buffer 102 the and frame buffer controller 104 are described below. The digital television decoder 110 and the digital television color-matrix 106 which interfaces the frame buffer 102 with the monitor 108 are conventional and for conciseness will not be discussed in detail here.

Figure 5:
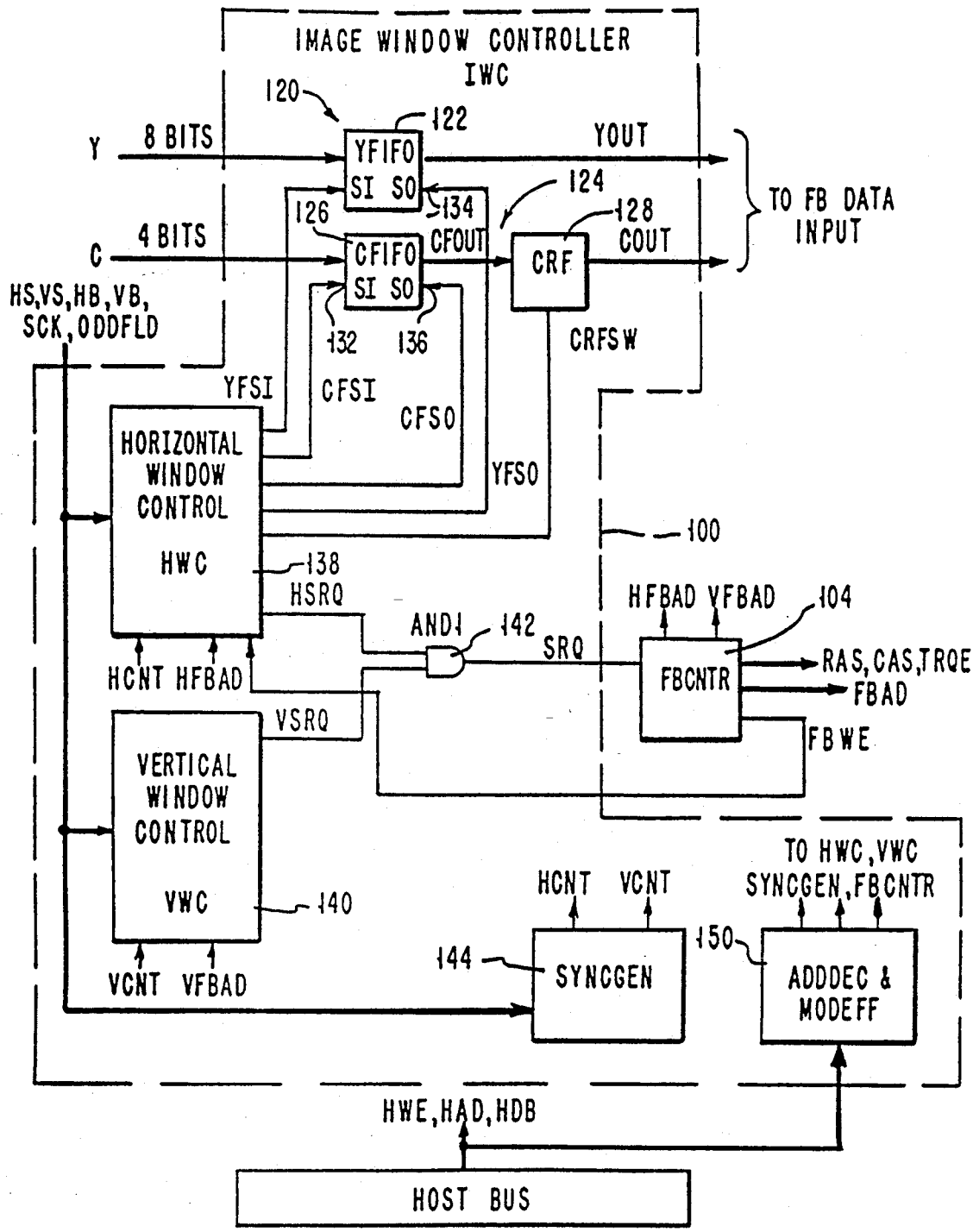
FIG. 5 is a schematic diagram of an image window controller of the preferred digital-television/graphics-display interface of FIG. 4.

Turning now to FIG. 5, the image window controller 100 is adapted to receive luminance/chrominance digital data from the digital television decoder 110, process the data according to the image-scaling procedure described above, and transmit the resulting data to a data input of the frame buffer 102. A luminance data path 120 includes a luminance first-in-first-out ("FIFO") device 122. A chrominance data path 124 includes a chrominance first-in-first-out device 126 connected to a chrominance data register file 128. The luminance first-in-first-out device 122 temporarily stores the luminance data, and the chrominance first-in-first-out device 126 and the chrominance register file 128 store chrominance data. For the case of image contraction, the first-in-first-out devices 122 and 126 can be implemented with three commercially-available integrated-circuit 4-bit-wide, 64-deep first-in-first-out memory units. For the case of image expansion in the vertical direction, greater storage capacity can be required for the first-in-first-out devices 122 and 126 as discussed below.

Shift-in inputs 130, 132 and shift-out inputs 134, 136 of the first-in-first-out devices 122, 126, as well as the internal operations of the chrominance register file 128 are controlled by a horizontal window control unit 138. The horizontal window control unit 138 also provides a horizontal sampling request signal, which corresponds to the television window horizontal timing coordinates. A vertical window control unit 140 is adapted to generate a vertical sampling request signal that corresponds to vertical timing coordinates of the television window. The horizontal sampling request signal and the vertical sampling request signal are combined by a sampling-request gate 142 to produce the sampling-request signal SRQ. The sampling-request signal informs the frame-buffer controller 104 to start loading luminance output data and chrominance output data from the output of the image window controller 100 into the frame buffer 102.

The timing coordinates of the television window are defined by internal counters of a synchronizer/generator 144. A vertical-count output is produced by counting television lines inside the television field; that is, by counting horizontal synchronization pulses HS in the range between the vertical synchronization pulses VS. A horizontal count is a number of sampling clock periods SCK inside a television line, i.e., between horizontal synchronization pulses HS. An oddfield signal which is active only during odd television-line fields of the television frames may be considered as an upper bit of the television line number, because its combination with the vertical count data provides a television line number inside the television frame.

After receiving the sampling-request signal SRQ, the frame-buffer-controller 104 generates a frame-buffer address sequence together with three control strobes RAS, CAS, TRQE and a frame-buffer write-enable signal FBWE. The frame buffer is built using video-dynamic RAM technology such as integrated circuits commercially available under the trade designation "TMX44C251 1 Mbit VideoRAM" from Texas Instruments Incorporated of Carrolton, Tex. A description of the control signals for the video dynamic RAM integrated circuits is available in the manufacturer's data sheets. The frame-buffer controller 104 also supplies horizontal frame-buffer address and vertical frame-buffer address signals to the horizontal window control unit 138 and the vertical window control unit 140 to be used as coordinates of the pixels inside the graphics window. It also delivers the frame-buffer write-enable signal to the horizontal window control unit 138 to be used as a frame-buffer sampling clock reference.

A host workstation provides the necessary control data to the image-window controller 100 and the frame-buffer controller 104 through host address and data buses under control of a host write enable signal HWE. The decoding of the addresses of different control registers and setup of different mode registers is done by an address decoder/mode-configuration unit 150, discussed below.

Figure 6:
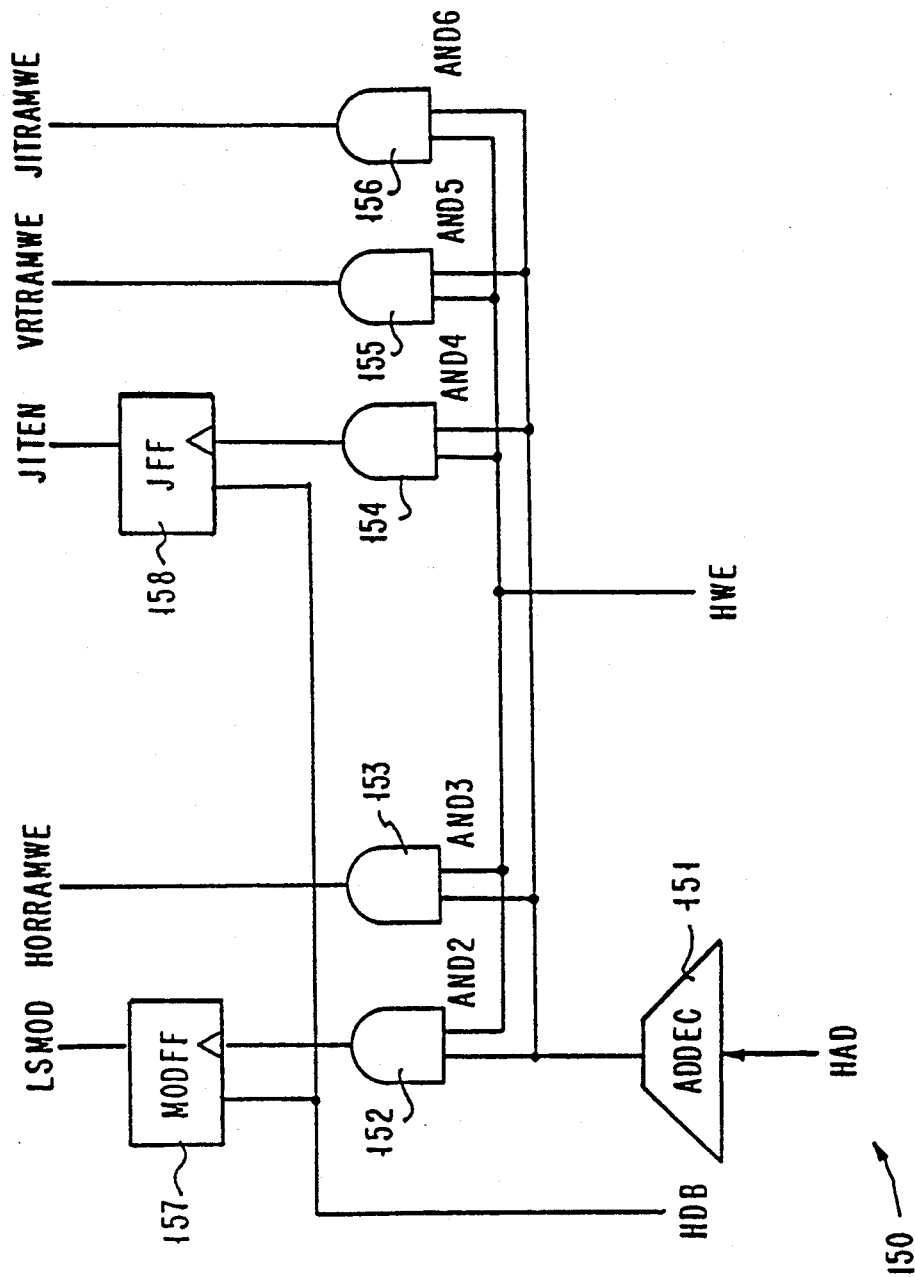
FIG. 6 is a circuit diagram of an address decoder and mode register of the image window controller of FIG. 5.

The address-decoder/mode-configuration unit 150 is shown in FIG. 6. It includes a host address decoder 151, five AND gates 152-156, and a pattern-loading-mode flip/flop 157 and a jitter mode flip/flop 158. The pattern-loading mode flip/flop 157 generates a pattern-loading mode signal LSMOD. When the pattern-loading mode signal is equal to zero, sampling of the luminance/chrominance data into the frame-buffer 102 is disabled and loading of image-scaling control patterns into a horizontal-contraction-control-pattern random access memory ("RAM") 160, a vertical-contraction-control-pattern RAM 162 and a jitter-control RAM 164 is enabled. The sampling patterns are calculated by the host workstation according to the scaling procedure set forth above and are loaded into the horizontal-contraction-control-pattern RAM 160, vertical-contraction-control-pattern RAM 162 and jitter-control RAM 164 during vertical blank intervals. During active video between the vertical blank pulses, the pattern-loading-mode signal LSMOD is changed by the host workstation to one, thus enabling the sampling of luminance/chrominance data into the frame buffer 102. The signals VRTRAMWE, HORRAMWE and JITRAMWE are used as corresponding write-enable signals to the three RAM storage units 160, 162, and 164, respectively.

The jitter-mode flip/flop 158 enables or disables a jitter mode during sampling into the frame buffer 102 by means of a jitter-mode signal JITEN. Disabling the jitter mode permits processing power of the host workstation to be saved, for example, in the case of fast-moving images, where jitter introduction is less important than in the case of slow moving or static images. If the jitter mode is not required, the jitter-control RAM 164 is idle and does not require loading data from the host workstation.

Figure 7:
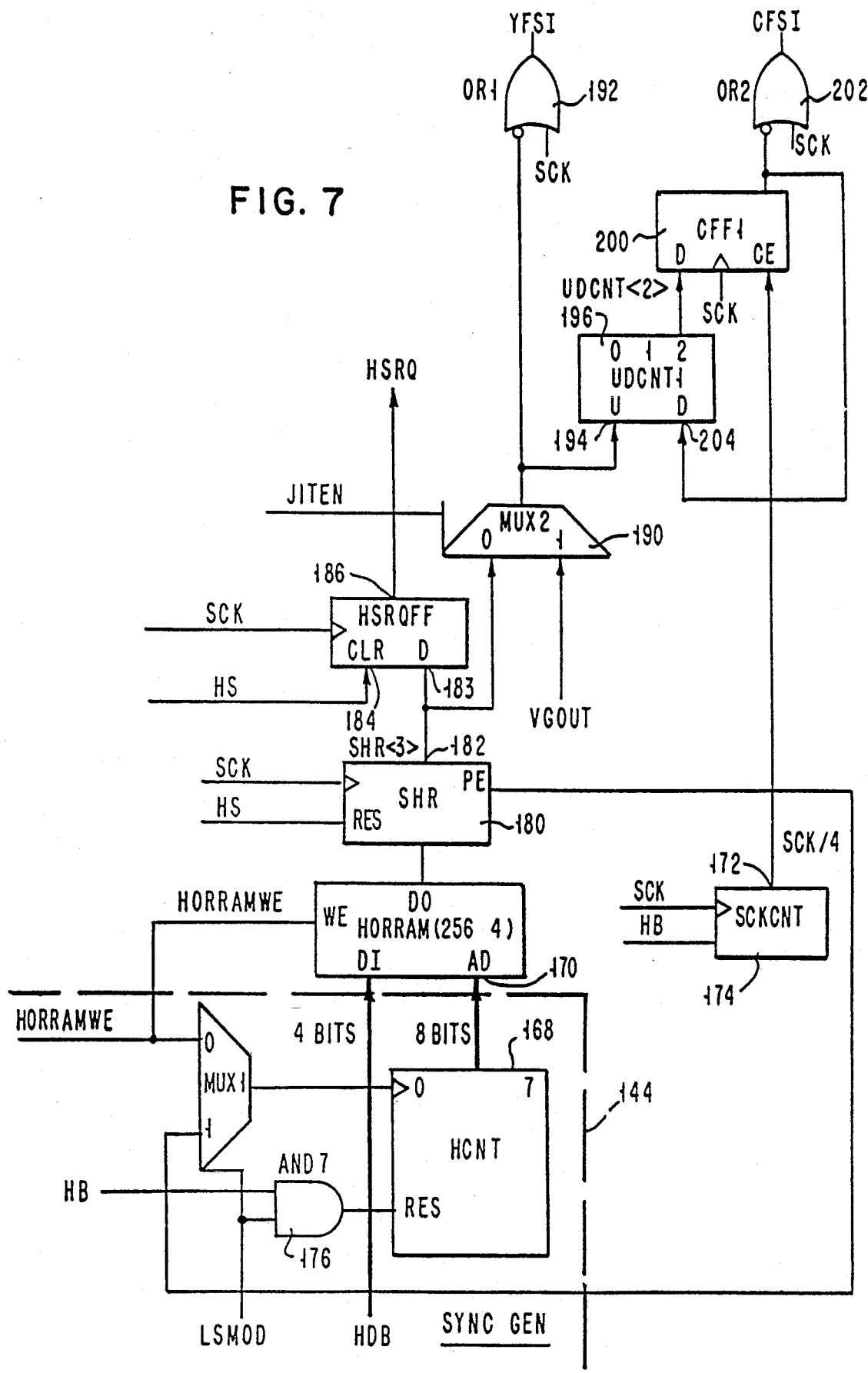
FIG. 7 is a circuit diagram of portions of a horizontal window controller and synchronizer/generator of the image window controller of FIG. 5 for horizontal image contraction.

A functional diagram of a portion of the horizontal window control unit 138 which is concerned with scaling down or image contraction is shown in FIG. 7. It also includes a part of the synchronizer generator 144 to explain the interface between timing circuitry and the horizontal window control unit 138.

The horizontal window control unit 138 includes the horizontal-contraction-control-pattern RAM 160. The horizontal-contraction-control-pattern RAM 160 stores a sequence of zeroes and ones referred to as a horizontal image-contraction control pattern to control a luminance-shift-in signal designated YFSI which is supplied to the shift-in input 130 of the luminance first-in-first-out device 122. The length of the horizontal-image-contraction control pattern corresponds to the maximum number of luminance samples from the output of the digital television decoder 110. For example, if the digital television decoder 110 uses the Philips digital video signal processing chip set, the horizontal-image-contraction control pattern length is 720.

The horizontal-image-contraction control pattern is calculated by the host workstation, combined in groups of 4 bits each, and loaded in the first 180 addresses of the horizontal-contraction-control pattern RAM 160, with the first location designated address 0. In the case of the NTSC or PAL or SECAM television standards, the horizontal contraction pattern RAM 160 need not be larger than 256 4-bit words. In the case of high-definition television for which the number of pixels may be between 1000 and 2000 in an active line, the size of the horizontal-contraction control pattern RAM 160 must be increased to 512. Note also, that if the length of the television window is less than an active television line, the beginning and the end of the horizontal-scaling transfer sequence must be zeroes. Therefore, the horizontal-scaling transfer sequence stored in the horizontal-contraction control pattern RAM 160 provides not only the scaling information data, but also the horizontal position of the television window relative to the television screen as well.

During video sampling, a horizontal counter 168 supplies the addresses to the horizontal-contraction control pattern RAM 160 at address inputs 170. The horizontal counter 168 is clocked by a sampling-clock divided-by-four signal SCK/4 from an output 172 of a sampling-clock-divider counter 174. The sampling-clock-divider counter divides the sampling-clock signal by four. Both the horizontal counter 168 and the sampling-clock-divider counter 174 are cleared by the horizontal blank signal HB from the digital television decoder 110 which is off during the time a horizontal line is active. As a result, the horizontal counter 168 starts counting immediately at the beginning of the active part of each television line and marks each group of four television samples by a consecutive number.

When the horizontal-image-contraction control pattern is being loaded into the horizontal-contraction-control pattern RAM 160 or is being changed, the pattern-loading-mode signal LSMOD set by the host workstation disables the HB signal applied to the reset input of the horizontal counter 168 through an AND gate 176 and switches by means of a two-input single-line multiplexor 178 the clock input of the horizontal counter 168 to a horizontal-RAM-write-enable signal HORRAMWE from the AND gate 153 in the address-decoder/mode-configuration unit 150. Data from a data bus of the host workstation is loaded into the horizontal-contraction-control pattern RAM 160. The horizontal-RAM-write-enable signal increments the horizontal counter 168 after each load, thus providing the next address for the horizontal-contraction-control-pattern RAM 160 to be loaded. At the end of the loading of the horizontal-contraction-control-pattern RAM 160 with the pattern, the pattern-loading-mode signal LSMOD may be set back to 1 in order to restore the sampling-clock divided by four signal SCK/4 and the horizontal-blanking signal HB to the horizontal counter 168.

The sampling-clock divided-by-four signal SCK/4 from the sampling-clock divider counter 174 controls a parallel-load-enable input of an image-contraction four-stage parallel-in/serial-out shift register 180. The output of the horizontal-contraction-control-pattern RAM 160 is loaded into the image-contraction shift register 180. Data from the image-contraction shift register 180 are shifted out synchronously with the sampling clock signal SCK from the digital television decoder 110, thereby providing a single bit pattern sequence at a serial-out output 182 of the shift-register 180.

The serial-out output 182 of the image-contraction shift register 180 is connected to a D input 183 of a type-D horizontal-sampling request flip/flop 184. The first "one" signal from the serial-out output 182 loads the flip/flop 184. A "Q" output 186 of the horizontal-sampling request flip/flop 184 generates the horizontal-sampling request signal HSRQ. The horizontal-sampling request signal will be active until the next horizontal synchronization signal HS, which is sufficient to store all the television active-line data sequence into the frame buffer 102.

If the jitter-mode signal JITEN from the jitter-mode flip/flop 158 is zero, so that the jitter mode is disabled, then the horizontal-scaling bit signal appears on an output of a two-input/single-line multiplexor 190. If the horizontal-scaling-bit signal is 1, an OR gate 192 generates the luminance-shift-in clock signal YFSI, which shifts a luminance data sample to the luminance first-in-first-out device 122. If the horizontal-scaling-bit signal is 0, the YFSI signal is not generated, and the luminance data sample is not loaded into the luminance first-in-first-out device 122, in other words, the luminance sample is skipped.

As shown in FIG. 7, the output of the multiplexor 190 is also connected to an increment input 194 of an image-contraction 3-bit up/down counter 196. An upper-bit output 198 of the image-contraction up/down counter 196 is clocked into a chrominance-pattern flip/flop 200. The output of the chrominance-pattern flip/flop 200 controls a chrominance-shift gate 202, which provides a sequence of chrominance-shift-in signals CFSI to the chrominance first-in-first-out device 126. The output of the chrominance-pattern flip/flop 200 is also connected to the decrement input 204 of the image-contraction up/down counter 196.

The function of the image-contraction up/down counter 196 is to calculate the difference between the number of luminance samples and the number of chrominance samples written in the frame buffer 102 at any particular moment. More specifically, the image-contraction up/down counter 196 is incremented by one by each sampling-enable bit from the serial-out output 182 of the shift register 180 if the output of the chrominance pattern flip/flop 200 is zero so that chrominance sampling is disabled; the image-contraction up/down counter 196 is decremented if the output of the chrominance pattern flip-flop 200 is one so that chrominance sampling is enabled, but luminance sampling is disabled; it is in a hold state, when luminance and chrominance data sampling are both disabled or enabled.

The operation of the image-contraction up/down counter 196 is summarized in Table I below:

TABLE I

| UP/DOWN COUNTER OPERATION | | |
|---|---|---|
| Incr. Input | Decr. Input | Operation |
| 0 | 0 | Hold |
| 1 | 0 | Increment |
| 0 | 1 | Decrement |
| 1 | 1 | Hold |

If the difference between the number of luminance and chrominance samples loaded into the frame buffer 102 is more than four, and if the sampling-clock-divided-by-four signal SCK/4 from the sampling-clock divide counter 174 is in an active transition state, the upper bit of the image-contraction up/down counter 196 becomes 1 and the next sampling-clock pulse SCK loads 1 into the chrominance pattern flip/flop 200. As a result, four consecutive chrominance-shift-in pulses CFSI are issued, and four chrominance data samples are loaded into the chrominance first-in-first-out device 126 starting on a four horizontal sample boundary. When the sampling-clock-divided-by-four SCK/4 transition becomes active again after four sampling clock pulses, and the output of the image-contraction up/down counter 196 is still one, chrominance data sampling is continued. If at this moment the output of the image-contraction up/down counter 196 is zero, the chrominance-pattern flip/flop 200 becomes zero and the next four chrominance samples are skipped.

The use of the image-contraction up/down counter 196 relieves the host work-station of a need to calculate a chrominance sampling contractioncontrol pattern and also saves a storage unit which would have been used to store such a chrominance sampling contraction-control pattern.

Use of a four-bit synchronization approach preserves a chrominance data structure. The digital television color matrix 106 must recognize the chrominance bit order. Therefore, the chrominance samples should be located at four-bit address boundaries in the frame buffer 102. Loading the chrominance samples sampled into the chrominance first-in-first-out device 126 in a manner described above provides for such modulus-four boundary alignment. In addition, the graphics window horizontal coordinates start on a four-bit boundary, because in a multiwindow environment it is inconvenient to store additional information to specify for each window how the color data is located inside that window. Furthermore, the four-bit synchronization approach makes the loading of the horizontal-contraction-control pattern RAM 160 faster than if a single 1-bit sequence had been used.

Figure 8:
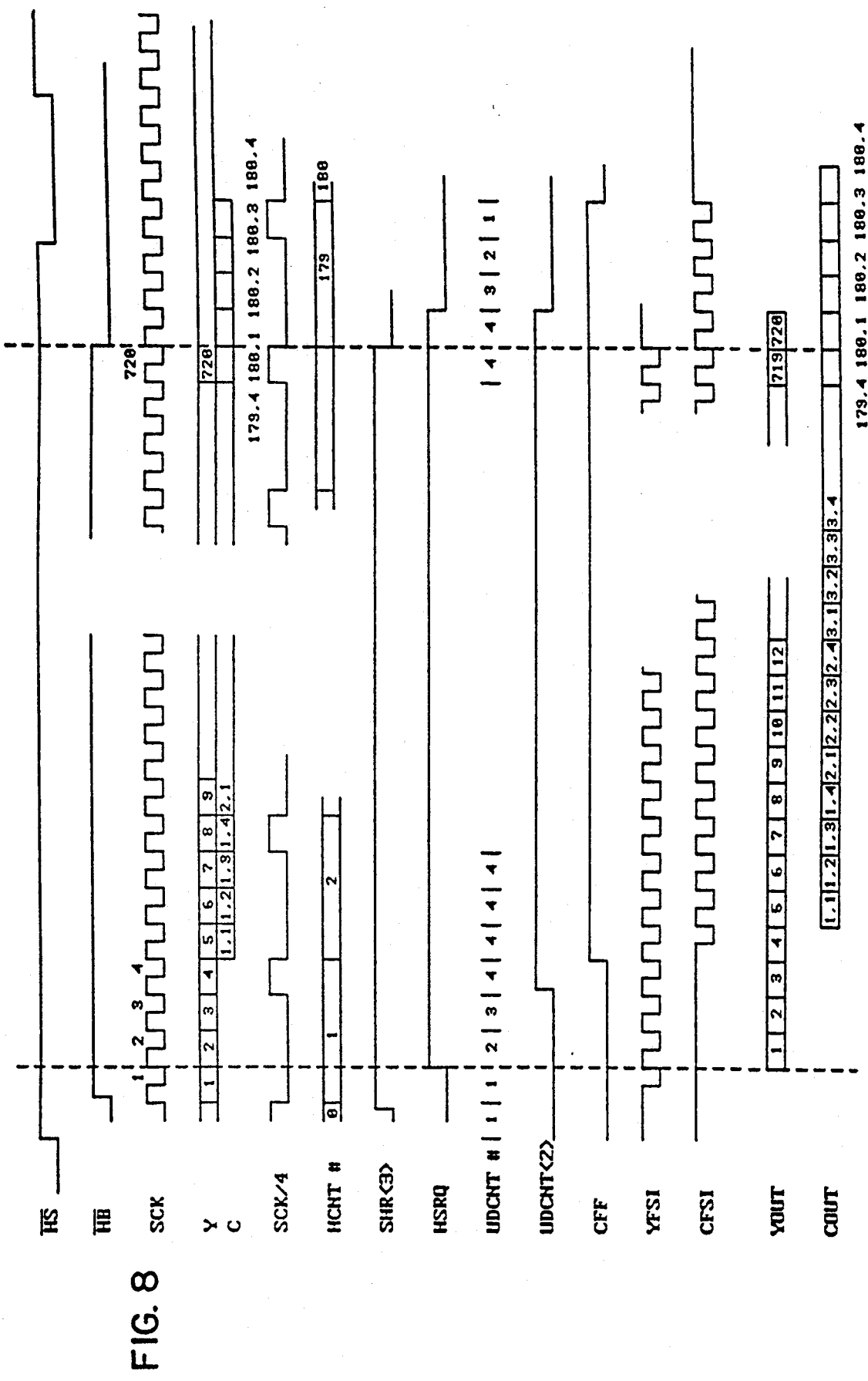
FIG. 8 is a timing diagram illustrating the operation of the circuit of FIG. 7 in the case when a television image is mapped to a graphics display without scaling in the horizontal dimension.

In FIG. 8, a timing diagram is given for the scaling mechanism described above in the special case in which no scaling is introduced. For each television line, 720 8-bit luminance samples and 180 4-bit chrominance samples are loaded respectively into the luminance first-in-first-out device 122 and the chrominance first-in-first-out device 126 as YOUT and COUT data. The 4-bit k-th data chunks of chrominance are numbered in FIG. 8 as k,1; k,2; k,3 and k,4. The YFSI and CFSI signals are negative pulses. As shown in FIG. 8, the COUT chrominance data are written into the chrominance first-in-first-out device 126 with four sampling-clock periods of delay. Such a delay is not a problem, because the frame buffer 102 reads data from the output of the first-in-first-out device and thus the delay is eliminated.

Figure 9:
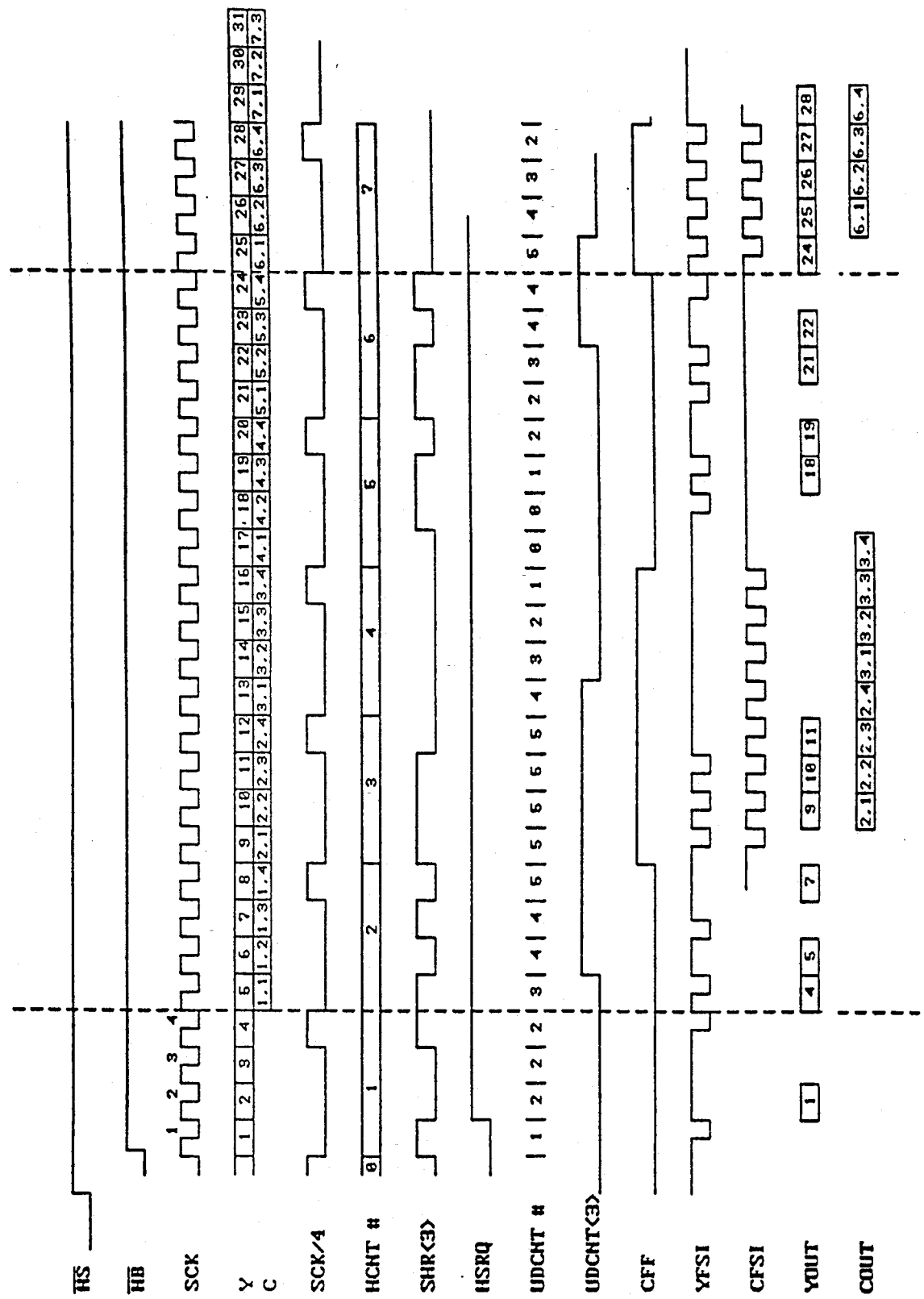
FIG. 9 is a timing diagram illustrating the operation of the circuit of FIG. 7 in the case when a television image is mapped to a graphics display with image contraction in the horizontal dimension.

In FIG. 9, a is given timing diagram for the mechanism of scaling down or image contraction according to some arbitrary horizontal contraction-control pattern. FIG. 9 illustrates in particular how chrominance COUT samples are distributed relative to luminance YOUT samples.

Note, that if a 4:2:2 format ratio had been used, the mechanism can be readily modified to provide for sampling the chrominance on modulus-two sample boundaries instead of modulus-four sample boundaries. If another known format designated 4:4:4 had been used, for which no chrominance data time-multiplexing is introduced, the portion of the scaling circuit which deals with the chrominance should not be used. In such a case, the luminance-shift-in signals YFSI can be applied for both luminance data and chrominance data.

Figure 10:
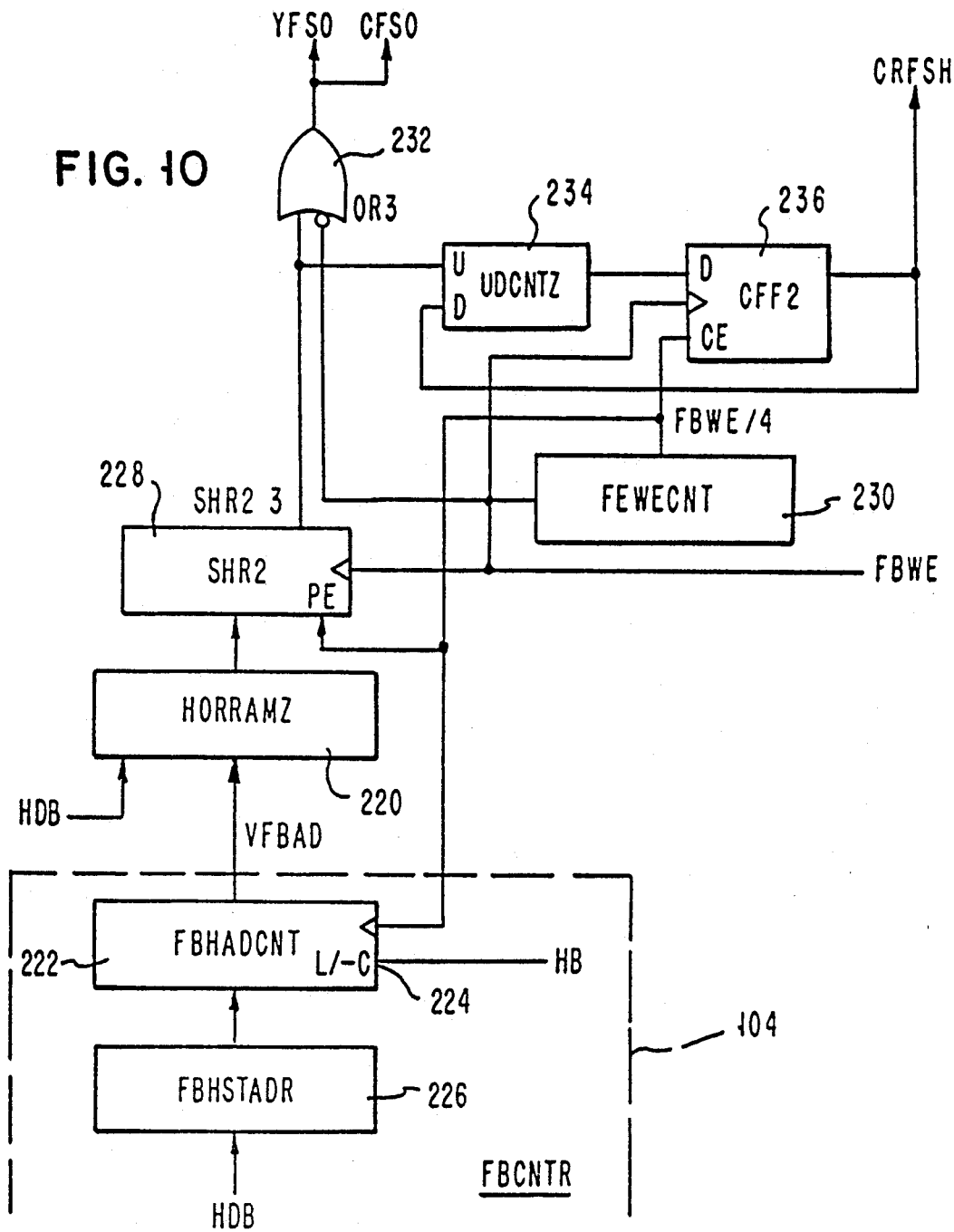
FIG. 10 is a circuit diagram of portions of the horizontal window controller and the synchronizer/generator of the image window controller of FIG. 5 for image expansion in the horizontal dimension.

A circuit for the horizontal window-controller 138 which provides for scaling up in the horizontal direction, i.e., image expansion in the horizontal direction, is illustrated in FIG. 10. A portion of the frame-buffer controller 104 is also shown in FIG. 10 to illustrate its interface with the image window controller 100.

The circuit of FIG. 10 is similar to the image contraction circuit discussed above in connection with FIG. 7. In order to repeatedly write the same data into the frame buffer, the first-in-first-out devices shift out pulses are skipped, thus causing an expansion of the image. The image contraction circuit of FIG. 7 and the image expansion circuit of FIG. 10 can work in parallel, as explained in the following paragraph.

The horizontal image-contraction-control pattern stored in the horizontal contraction-control-pattern RAM 160 also defines the location of the television window in the case of image expansion as it did in the case of image contraction, but the pattern consists of consecutive ones without zeros corresponding to the image area of the window. Thus the horizontal image-contraction control pattern does not cause any data skipping inside the horizontal boundaries of the window.

A horizontal image-expansion control pattern of ones and zeroes, where zero corresponds to sample replication, is stored in a horizontal-expansion-control-pattern RAM 220. The number of 4-bit words which can be stored into the horizontal-expansion-control-pattern RAM 220 corresponds to the horizontal size of the graphics image. Specifically, it is greater than or equal to the number of pixels in a horizontal line of high-resolution display screen divided by four.

An address input of the horizontal-expansion-control-pattern RAM 220 is controlled by an output of a frame-buffer horizontal address counter 222. The frame-buffer horizontal address counter 222 uses a frame-buffer-write-enable-signal divided by-four signal FBWE/4 from the output of a frame-buffer write-enable counter 230. The frame-buffer write-enable-signal FBwe is supplied to a clock input of the frame-buffer write-enable counter 230 from the frame-buffer counter 104 during the sampling request SRQ interval. The number in the frame-buffer horizontal address counter 222 corresponds to a coordinate of the word to be written in the frame buffer. The left-most coordinate which defines the beginning of a graphics window, is loaded from a frame-buffer horizontal-start-address register 226 into the frame-buffer horizontal address counter 222 at the beginning of every television line by the horizontal blanking signal HB connected to a load/count input 224 of the address counter. The loading process of the horizontal-expansion-control-pattern RAM 220 is essentially identical to the loading of the horizontal-contraction-control-pattern RAM 160 discussed above and for conciseness will not be explained further.

The output of the horizontal-expansion-control-pattern RAM 220 is loaded into an image-expansion four-stage parallel-in/serial-out shift register 228. The clock for the frame-buffer horizontal-address-counter 222 and a parallel load enable signal for the image-expansion shift register 228 are derived from an output of the frame-buffer write-enable-divider-counter 230. The write-enable-divider counter 230 divides the frame-buffer write-enable signal FBWE by four. The frame-buffer write-enable-divider counter 230 provides a function similar to the sampling-clock-divider counter 174 on FIG. 7.

The most-significant serial-out bit of the serial-out output of the shift register 228 enables luminance-shift-out pulses YFSO and chrominance shift-out pulses CFSO by gating the frame-buffer write-enable signal through an OR gate 232. The serial-out output signal is also counted by an image-expansion up/down counter 234, which in turn controls D-input of an image-expansion chrominance-pattern flip/flop 236. The chrominance-pattern flip/flop 236 receives the data synchronously with an active transition of the output of the frame-buffer write-enable image-expansion counter 220.

The functions of the image-expansion up/down counter 234 and the image-expansion chrominance-pattern flip/flop 236 are very similar to those of the image-contraction up/down counter 196 and the image-contraction chrominance-pattern flip/flop 200. However, there is a difference in that an output of the image-expansion chrominance-pattern flip/flop 236—a signal designated CRFSW—controls the chrominance register file 128 discussed below.

Figure 11:
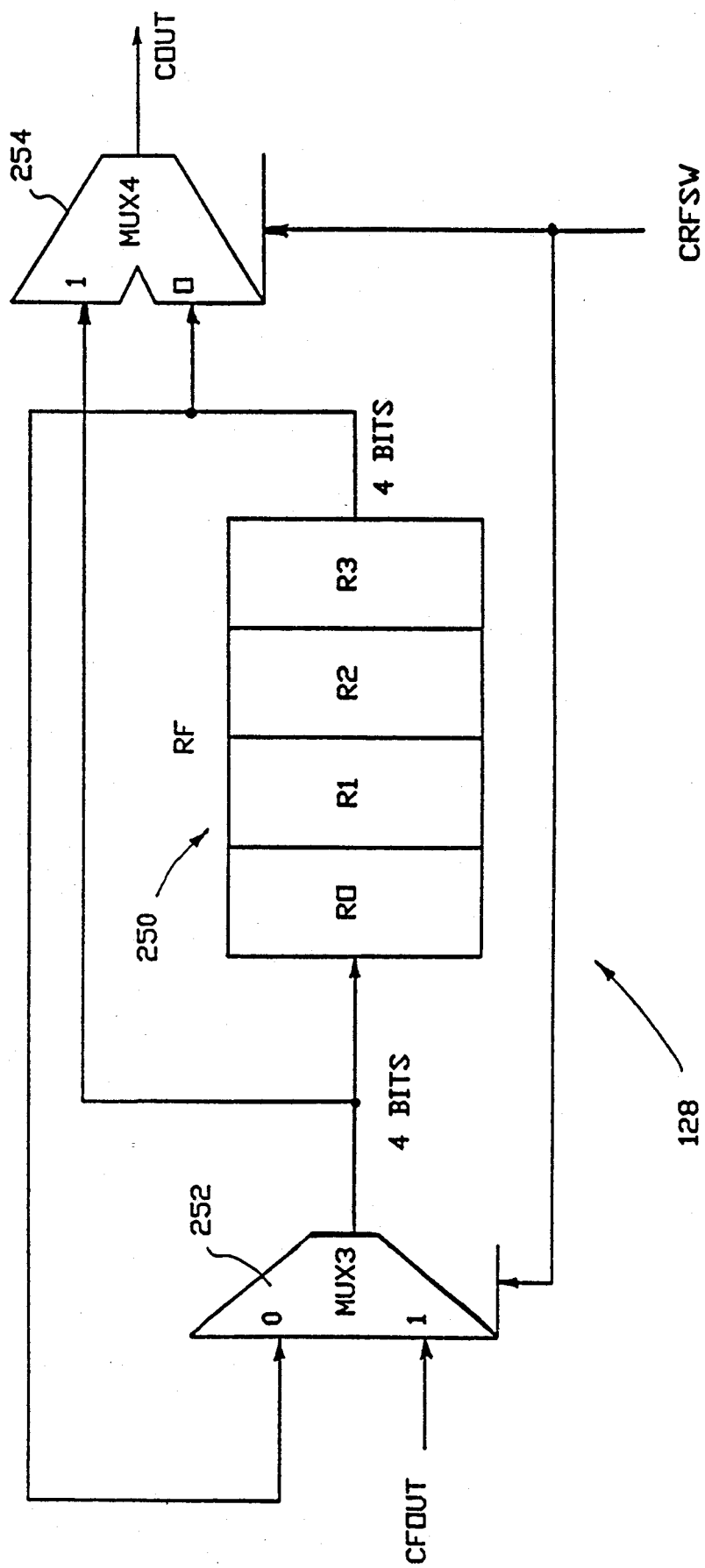
FIG. 11 is a circuit diagram of a chrominance register file of the image window controller of FIG. 5.

Referring now to FIGS. 5 and 11, the chrominance register file 128 includes a register file 250 which holds the four samples of chrominance data CFOUT most recently stored in the frame-buffer. If the CRFSW signal from the image-expansion chrominance pattern flip/flop 236 is one, the output of the chrominance first-in-first-out device 126 is switched by a register-file input multiplexor 252 and a register-file output multiplexor 254 directly to the frame-buffer 102. If the signal CRFSW from the chrominance-pattern flip/flop 236 becomes zero-which means that chrominance data must be replicated—the output of the register file 250 is loaded to the frame buffer 102 through the register-file output multiplexor 254 and simultaneously loaded back into the register file through the register-file input multiplexor 252. The four most recent chrominance samples will be replicated in the frame buffer 102 so long as the CRFSW signal stays zero.

When jitter is to be introduced into the horizontal sampling process, a special look-up technique similar to using a horizontal-image-scaling control-pattern RAM approach, is possible, but not convenient because it requires a large RAM to keep different patterns for all television lines. Basically, such a RAM would have to be large enough to store a one-bit image pattern for the entire screen with television resolution. It would also require more time to load the image pattern than the vertical blank period.

A more practical approach is to use a hardware vector generator for calculating the desired pattern. The vector generator may exploit essentially any known vector drawing technique. The Bresenham's line-drawing procedure is particularly preferred. The vector generator should be fast enough to work with sampling-clock speed. Conventional high-speed vector generators, which are frequently a part of a graphics controller hardware, may be used for this purpose.

Figure 12:
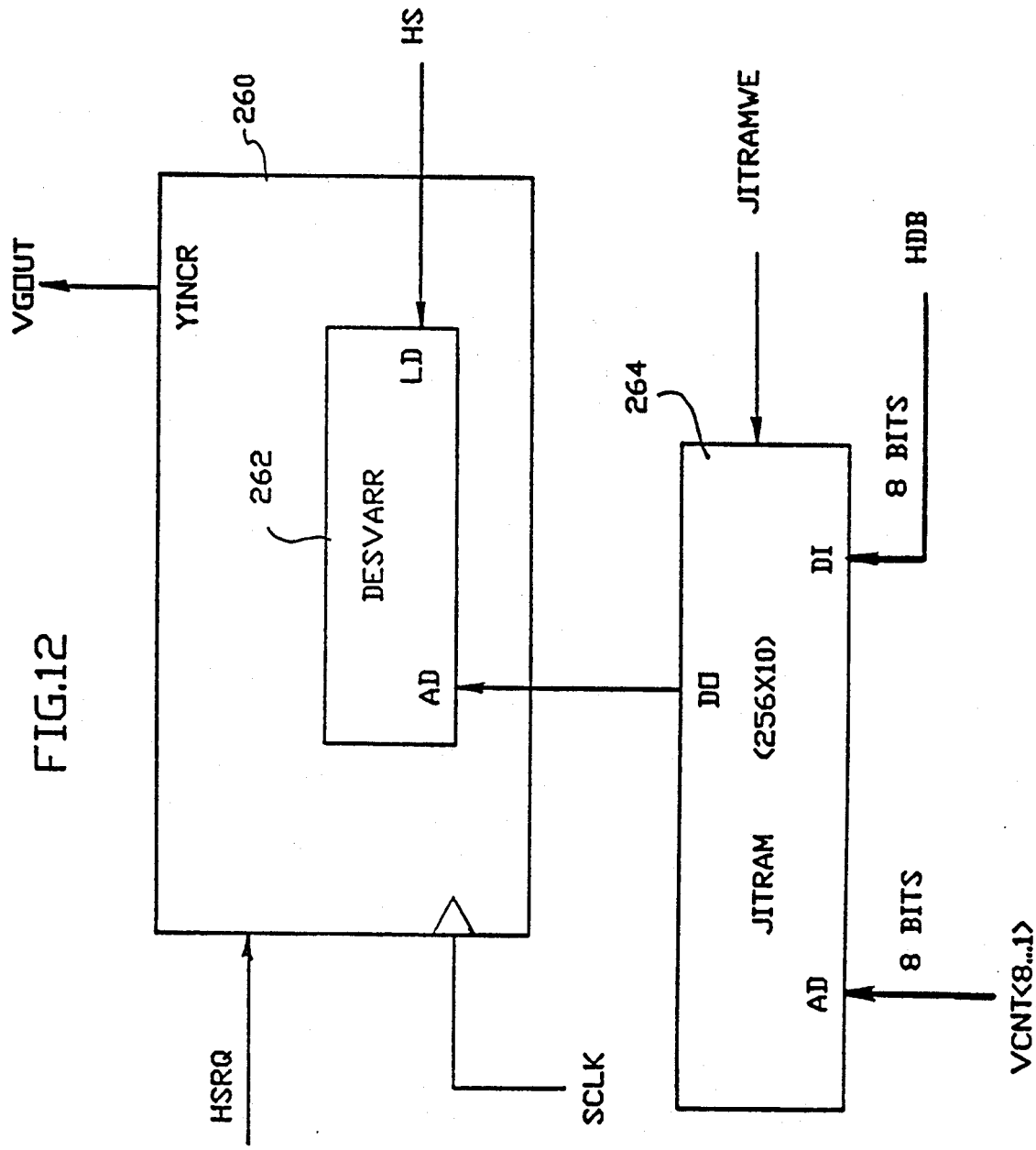
FIG. 12 is a schematic block diagram of a horizontal sampling-control circuit for the horizontal window controller of FIG. 5 which introduces a "jitter" into the mapping of successive television lines into the graphics display.

The block diagram of a jitter-control circuit is shown in FIG. 12. The circuit includes a Bresenham vector generator 260 with loadable initial error data. The initial-error data is equivalent to the decision variable data described in published literature relating to the Bresenham procedure. The initial-error data is loaded every new line by a horizontal sync signal to an initial-error register 262 from the output of a 256 by 10-bit initial-error-value memory 264.

An address input 266 of the initial-error-value memory 264 is supplied by a count output of a vertical television line counter in the synchronizer/generator 144. Error-initial-value data can be loaded into the initial-error-value memory 264 from the host workstation in a manner similar to that already described above.

The vector drawing process is enabled by a horizontal sampling request signal. An output signal VGOUT from the vector generator which is normally used as a signal to increment a frame-buffer address during vector drawing is used as a pattern bit instead of the signal from the image-contraction shift register 180 shown in FIG. 7. The jitter-mode enable signal JITEN controls the multiplexor 190 of the window control circuit of FIG. 7 to connect the output signal from the vector generator 260 to the OR gate 192 and the increment input 194 of the image-contraction up/down counter 196.

Figure 13:
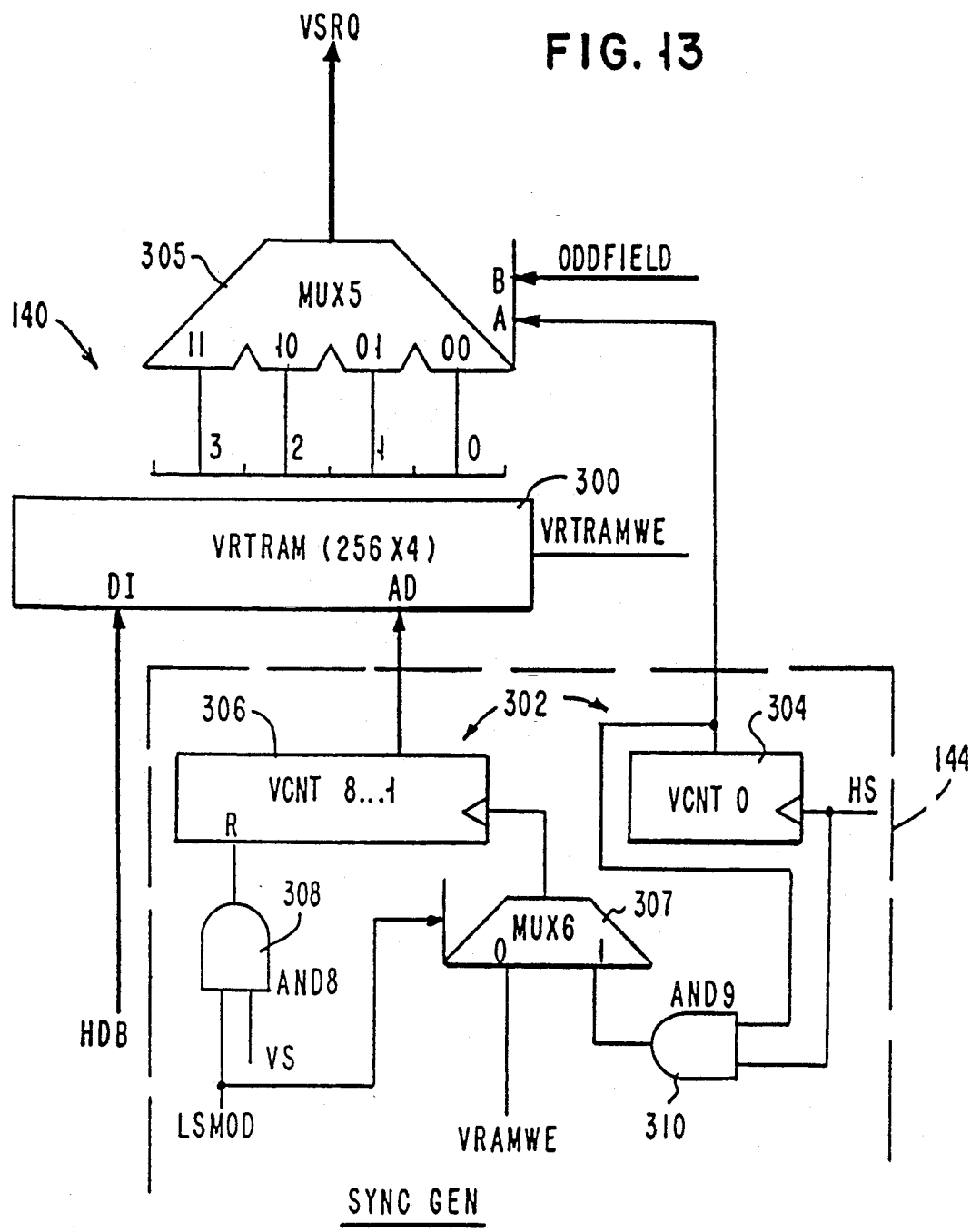
FIG. 13 is a circuit diagram of portions of a vertical window controller and the synchronizer/generator of the image window controller of FIG. 5, for image contraction in the vertical dimension.

The vertical window control circuits 140 for scaling a television image down in the vertical dimension is shown in FIG. 13. The vertical window control disables a vertical sampling request signal for the lines which should not be sampled.

A vertical-image-contraction control pattern is stored into a 256 4-bit word vertical-contraction control pattern RAM 300, which provides vertical coordinates of the television window to be sampled as well as the pattern of the lines to be skipped. The address for the vertical-contraction-control pattern RAM 300 is supplied by the vertical television-line counter 302 which is a part of the synchronizer/generator 144. The vertical television line counter 302 is a nine-bit binary counter divided into two stages: a least-significant-bit stage 304 and an eight-bit upper stage 306. Output data from the vertical-contraction-control-pattern RAM 300 feeds inputs of a vertical-image-contraction four-input, single-bit-wide multiplexor 305. The output of the vertical-image contraction multiplexor 305 enables a vertical sampling request signal VSRQ.

During a loading mode defined by the pattern-loading-mode signal LSMOD from the pattern-loading mode flip/flop 157 being zero, a clock-select multiplexor 307 disconnects the horizontal sync signal HS from the clock input of the upper stage 306 of the vertical television-line counter 302 and connects a vertical RAM write-enable signal VRAMWE instead. The vertical sync signal VS is also disconnected from a reset input of the upper stage 306 by operation of a reset-enable AND gate 308. As a result, the vertical RAM write-enable signal increments only the upper 8 bits of the vertical television-line count, which permits pattern data to be loaded from the host into the vertical-contraction-control pattern RAM 300 during vertical blank intervals in a way similar to loading data to the horizontal-contraction-control pattern RAM 160.

During a sampling mode, when the pattern-loading-mode signal LSMOD equals one, the clock-select multiplexor 307 connects the output of the least-significant-bit stage 304 combined with the horizontal sync signal in a clock-enable AND gate 310 to a clock input of the upper stage 306 of the vertical television-line counter 302. As a result, each address location of the vertical contraction-control pattern RAM 300 is repeated twice during sampling. Consequently, the vertical image-contraction control pattern may be loaded as if the television line sequence were non-interlaced, so that a programmer need not worry about interlacing while calculating the vertical image-contraction control pattern according to the sequential raster line numbers. But the pattern will be read from the output of the vertical image-contraction multiplexor 305 according to the interlaced television raster principle. For that reason, the control inputs of the multiplexor 305 are connected to the ODDFLD signal from the digital television decoder 110 and to the output of the least-significant-bit stage 304 of the vertical television line counter 302.

Figure 14:
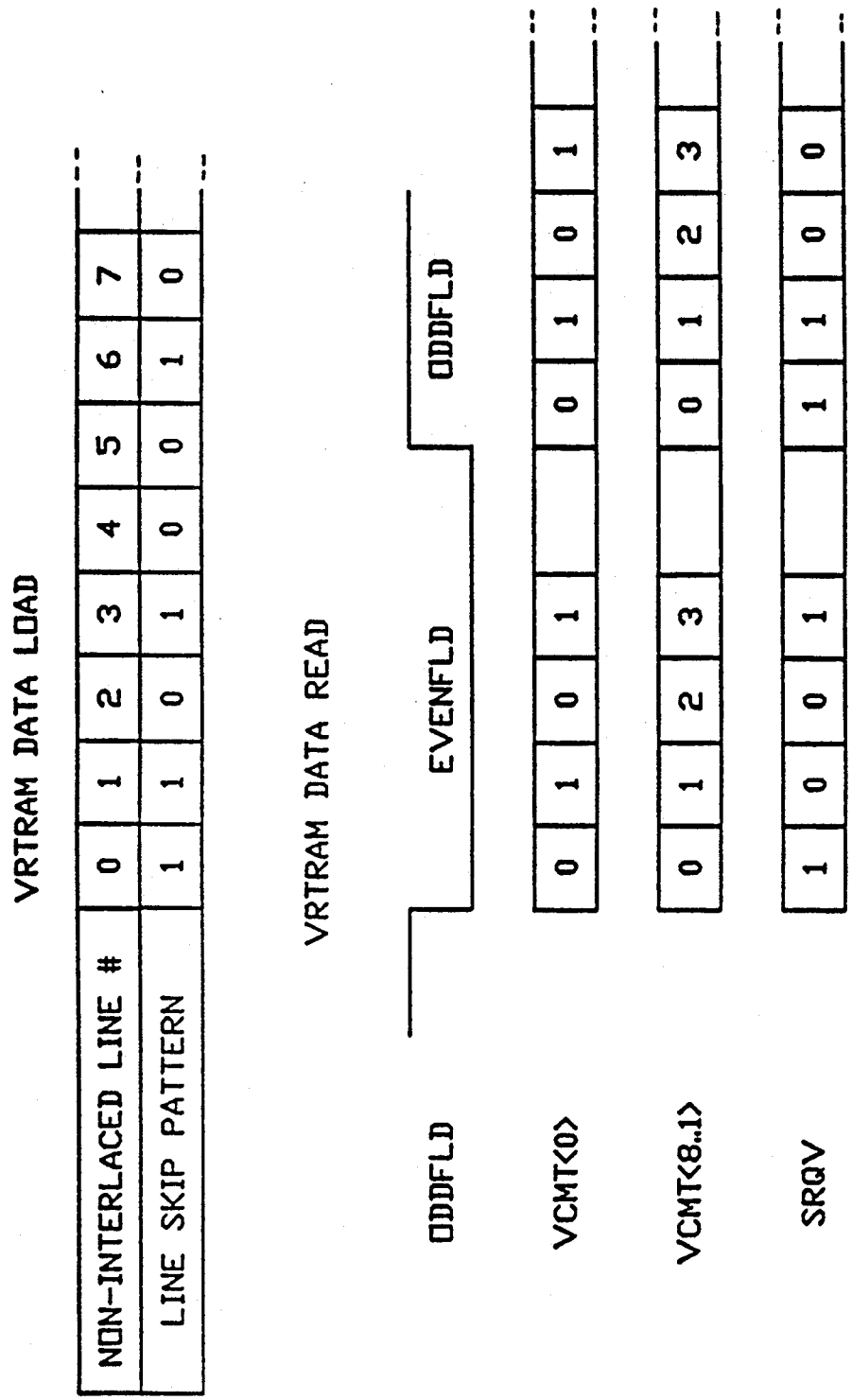
FIG. 14 is a diagram representing operation of the vertical window controller of FIG. 13.

In the diagram of FIG. 14, an upper portion of the diagram shows an arbitrary vertical image-contraction control pattern labelled "Line Skip Pattern," which is stored in the vertical contraction-control pattern RAM 300 and a lower half shows the pattern retrieval during the sampling process. Two television fields EVENFLD and ODDFLD are indicated by the signal ODDFLD being negative or positive as shown in FIG. 14. The vertical television line count data sequence during sampling provides the retrieval of the even pattern memory location numbers 0,2,4, . . . during the even field, and the odd pattern memory location numbers 1,3,5, . . . during the odd field.

Vertical sampling control in the case when the scaling ratio is greater than one may not be similar to the approach of horizontal image expansion. Suppose the frame buffer address is manipulated with the purpose of repeating the stored data according to a vertical image-expansion control pattern. One problem is that it would be necessary to have several line data memories in order to store the incoming television data for repetition, since there is no way to freeze the television signal for the time when the line sampling process is to be repeated. In the extreme case, a first-in-first-out device would have to be able to store all the television data except for one line.

A solution to this problem is to use a secondary port register to random-memory transfer for dynamic video RAMs. Such a mode is included in several video RAM chip technologies, such as the Texas Instrument dual-port video RAMs. The procedure is to read the line which has just been sampled into the frame buffer 102 into the sequential port, and then write it into the random port as many times as needed according to the replication requirements imposed by the vertical image-expansion control pattern.

Such a method requires a specialized control of the video refresh address, because such transfer cycles might be permitted only when a sequential port is available, for example, during a high-resolution blank interval. So, if a line should be replicated, it should be sampled into the frame buffer, for example, in the address 0, then if a sequential port is not available, the next line should be sampled into the frame buffer address 3, until the the high-resolution blank becomes active. Then the loading of the current television line should be interrupted, the line from the address 0 should be written to the secondary port, then the secondary port should be loaded into the random memory address 2, and then memory address should become 3 again and sampling mode can be restored.

A drawback of this method is that it requires the graphic window to be an entire graphics screen. As a practical matter, the most frequent case, when the expansion of a low resolution television image to a full-size high-resolution screen is required, involves the entire graphics screen. The most important applications in the multi-window environment typically require only scaling down.

It is not intended to limit the present invention to the specific embodiments described above. It is recognized that changes may be made in the circuits and processes specifically described herein without departing from the scope and teaching of the instant invention, and it is intended to encompass all other embodiments, alternatives, and modifications consistent with the invention.

We claim:

1. A digital television/graphics display interface for receiving digitally-encoded luminance samples and chrominance samples representing a live color television signal from a digital television decoder at a predetermined first number of television lines per frame and a second number of luminance samples per television line and storing selected ones of the luminance samples and the chrominance samples in predetermined memory locations in a frame buffer for display in a window image in a graphics display, the window image having a third number of rows of pixels and a fourth number of pixels per row, the third number of rows of pixels in the window image being different from the first number of television lines per frame and the fourth number of pixels per row being different from the second number of luminance samples per television line, the interface comprising:

(a) a luminance first-in-first-out device connected to a luminance sample output of the digital television decoder for storing selected ones of the luminance samples from the digital television decoder and to a luminance-sample input of the frame buffer of the graphics display;

(b) a chrominance first-in-first-out device connected to a chrominance sample output of the digital television decoder for receiving chrominance samples from the digital television decoder and to a chrominance-sample input of the frame buffer of the graphics display;

(c) horizontal window control means connected to control input means of the luminance first-in-first-out device and to control input means of the chrominance first-in-first-out device for controllably enabling the storage of individual ones of the luminance samples in the luminance first-in-first-out device and for controllably enabling the reading of individual ones of the luminance samples from the luminance first-in-first-out device and for controllably enabling the storing of individual ones of the chrominance samples into the chrominance first-in-first-out device and for controllably enabling the reading of individual ones of the chrominance samples from the chrominance first-in-first-out device, the horizontal window control means including a horizontal image-contraction control-pattern memory for storing a binary horizontal image-contraction control pattern, the number of bits in the horizontal image-contraction control pattern being at least as great as the second number of luminance samples in a television line, the horizontal window controller being adapted to enable or disable the storing of individual ones of corresponding luminance and chrominance sample in the luminance and chrominance first-in-first-out devices, respectively, in accordance with the state of corresponding individual bits in the horizontal image-contraction control pattern stored in the horizontal image-contraction control-pattern memory;

(d) vertical window control means for controllably enabling the storage of sample from individual ones of the television lines, the vertical window control means including a vertical image-contraction control-pattern memory for storing a binary vertical image-contraction control pattern, the number of bits in the vertical image-contraction control pattern being at least as great as the first number of television lines, the vertical window control means being adapted to enable or disable the storing of samples from individual ones of the television lines in accordance with the state of corresponding individual bits in the vertical image-contraction control pattern stored in the vertical image-contraction control-pattern memory; and (e) computation means connected to the horizontal window control means and to the vertical window control means for generating a horizontal image-contraction control pattern for storage in the horizontal image-contraction control-pattern memory of the horizontal window control means, and a vertical image-contraction control pattern for storage in the vertical image-contraction control-pattern memory of the vertical window control means, the computation means being adapted to calculate the horizontal and vertical image-contraction control patterns independently of one another by stepwise altering a cross-multiplication error term towards zero, an initial error term being varied from pattern to pattern to introduce a variation in the patterns.

2. A digital-television/graphics-display interface circuit for receiving digitally-encoded luminance samples and chrominance samples representing a color-television signal for a live color-television image from a digital-television decoder at a predetermined lines-per-frame number of television lines per frame and a predetermined samples-per-line number of luminance samples per full-length television line and transmitting selected ones of the luminance samples and the chrominance samples to a frame buffer for storage in destination-window-area memory locations, which memory locations are associated with a destination-window area of a graphics display, for display as a source-window portion of the live color-television image in the destination-window area of the graphics display, the destination-window area having a selectable destination-window-height number of rows of pixels and a selectable destination-window-width number of pixels per row, the source-window portion of the color-television image having a selectable source-window-height number of television lines in the source-window portion and a source-window-width number of luminance samples in a television line in the source-window portion, the destination-window-height number of rows of pixels in the destination window area being different from the source-window-height number of television lines in the source-window portion and the destination-window-width number of pixels per row in the destination-window area being different from the source-window-width number of luminance samples in the television line in the source-window portion, the interface circuit comprising:

(a) a luminance first-in-first-out device having a luminance-sample input, a luminance-sample output, a luminance-shift-in-control-signal input, and a luminance-shift-out-control-signal input, the luminance-sample input of the luminance first-in-first-out device being connectable to a luminance-sample output of the digital-television decoder for controllably shifting in selected ones of the luminance samples received from the digital-television decoder in response to shift-in-control-signals applied to the luminance shift-in-control-signal input, and the luminance-sample output being connectable to a luminance-sample input of the frame buffer of the graphics display for controllably shifting out luminance samples for transmitting to the frame buffer in response to shift-out-control signals applied to the luminance shift-out-control-signal output;

(b) a chrominance first-in-first-out device having a chrominance-sample input, a chrominance-sample output, a chrominance shift-in-control signal input, and a chrominance shift-out-control signal input, the chrominance-sample input of the chrominance first-in-first-out device being connectable to a chrominance-sample output of the digital-television decoder for controllably shifting in chrominance samples received from the digital-television decoder in response to chrominance shift-in-control-signals applied to the chrominance shift-in-control-signal input, and the chrominance-sample output being connectable to a chrominance-sample input of the frame buffer of the graphics display for controllably shifting out chrominance samples for transmission to the frame buffer in response to chrominance shift-out-control signals applied to the shift-out-control-signal output;

(c) horizontal window control means connected to the luminance shift-in-control-signal input and the luminance shift-out-control-signal input of the luminance first-in-first-out device and to the chrominance shift-in-control-signal input and the chrominance shift-out-control-signal input of the chrominance first-in-first-out device for controllably enabling the shifting of individual ones of the luminance samples into and out of the luminance first-in-first-out device and for controllably enabling the shifting of individual ones of the chrominance samples into and out of the chrominance first-in-first-out device, the horizontal window control means including a horizontal image-contraction control-pattern memory for storing a binary horizontal image-contraction control pattern, the number of bits in the horizontal image-contraction control pattern being at least as great as the samples-per-line number of luminance samples in a television line, the horizontal window control means being adapted to enable or disable the shifting of individual ones of corresponding luminance and chrominance samples from a television line into the luminance and chrominance first-in-first-out devices, respectively, in accordance with the state of corresponding individual bits in the horizontal image-contraction control pattern stored in the horizontal image-contraction control-pattern memory;

(d) vertical window control means for controllably enabling and disabling the loading of luminance and chrominance samples from individual ones of the television lines into the frame buffer, the vertical window control means including a vertical image-contraction control-pattern memory for storing a binary vertical image-contraction control pattern, the number of bits in the vertical image-contraction control pattern being at least as great as the lines-per-frame number of television lines, the vertical window control means being adapted to enable or disable the storing of samples from individual ones of the television lines in accordance with the state of corresponding individual bits in the vertical image-contraction control pattern stored in the vertical image-contraction control-pattern memory; and (e) computation means connected to the horizontal window control means and to the vertical window control means for generating horizontal image-contraction control patterns for storage in the horizontal image-contraction control-pattern memory of the horizontal window control means, and vertical image-contraction control patterns for storage in the vertical image-contraction control-pattern memory of the vertical window control means, the computation means being adapted to calculate each of the horizontal and vertical image-contraction control patterns essentially by a computer-graphics vector-drawing procedure.

3. The interface circuit according to claim 2 in which the vector-drawing procedure includes stepwise altering a cross-multiplication error term towards zero.

4. The interface circuit according to claim 3 in which the vector-drawing procedure in a Bresenham vector-drawing procedure.

5. The interface circuit according to claim 3 in which the vector-drawing procedure includes varying an initial term from pattern to pattern to introduce a variation in the patterns.

* * * * *